US012795152B2

(12) United States Patent
Chen et al.

(10) Patent No.: US 12,795,152 B2
(45) Date of Patent: Nov. 10, 2026

(54) EXTENDED TEMPLATE MATCHING FOR VIDEO CODING

(71) Applicant: MEDIATEK INC., Hsinchu City (TW)

(72) Inventors: Hong-Hui Chen, Hsinchu City (TW); Chen-Yen Lai, Hsinchu City (TW); Chun-Chia Chen, Hsinchu City (TW); Chih-Wei Hsu, Hsinchu City (TW); Tzu-Der Chuang, Hsinchu City (TW); Ching-Yeh Chen, Hsinchu City (TW); Yu-Wen Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/857,329

(22) PCT Filed: Apr. 18, 2023

(86) PCT No.: PCT/CN2023/088940
§ 371 (c)(1),
(2) Date: Oct. 16, 2024

(87) PCT Pub. No.: WO2023/202569
PCT Pub. Date: Oct. 26, 2023

(65) Prior Publication Data

US 2025/0274604 A1 Aug. 28, 2025

Related U.S. Application Data

(60) Provisional application No. 63/332,292, filed on Apr. 19, 2022.

(51) Int. Cl.
*H04N 19/105* (2014.01)
*H04N 19/139* (2014.01)
(Continued)

(52) U.S. Cl.
CPC ......... *H04N 19/521* (2014.11); *H04N 19/105* (2014.11); *H04N 19/139* (2014.11); *H04N 19/176* (2014.11)

(58) Field of Classification Search
CPC ... H04N 19/513; H04N 19/139; H04N 19/105
See application file for complete search history.

(56) References Cited

U.S. PATENT DOCUMENTS 10,491,917 B2 * 11/2019 Chen .................... H04N 19/159
10,701,366 B2 * 6/2020 Chen ...................... H04N 19/44
(Continued)

FOREIGN PATENT DOCUMENTS

CN 12075084 A 12/2019
CN 110581992 A 12/2019
(Continued)

OTHER PUBLICATIONS

Enhanced Template Matching in FRUC Mode; Jan. 2017. (Year: 2017).*
(Continued)

*Primary Examiner* — Luis Perez-Fuentes
(74) *Attorney, Agent, or Firm* — McClure, Qualey & Rodack, LLP

(57) ABSTRACT

Methods for using extended templates to refine motion vectors is provided. A video coder generates a template for a current block based on an average of prediction samples in first and second reference pictures referenced by first and second motion vectors. The template and the current block may be different in size or shape. The video coder searches the first reference picture to refine the first motion vector based on a matching cost between samples referred by the refined first motion vector and the samples of the template. The video coder searches the second reference picture to refine the second motion vector based on a matching cost
(Continued)

between samples referred by the refined second motion vector and the samples of the template. The video coder uses the refined first and second motion vectors to encode or decode the current block.

16 Claims, 19 Drawing Sheets

(51) Int. Cl.
*H04N 19/176* (2014.01)
*H04N 19/513* (2014.01)

(56) References Cited

U.S. PATENT DOCUMENTS

| | | | | |
|---|---|---|---|---|
| 10,911,768 | B2 | 2/2021 | Xu | |
| 11,671,616 | B2 * | 6/2023 | Zhang | H04N 19/105 375/240.12 |
| 11,924,461 | B2 | 3/2024 | Xu | |
| 11,991,351 | B2 | 5/2024 | Xiu | |
| 12,075,084 | B2 | 8/2024 | Liu | |
| 12,219,166 | B2 * | 2/2025 | Zhang | H04N 19/176 |
| 12,603,990 | B2 * | 4/2026 | Deng | H04N 19/105 |
| 2011/0176611 | A1 * | 7/2011 | Huang | H04N 19/46 375/E7.123 |

FOREIGN PATENT DOCUMENTS

| | | | |
|---|---|---|---|
| CN | 110719469 | A | 1/2020 |
| CN | 111903131 | A | 11/2020 |
| CN | 112106367 | A | 12/2020 |
| EP | 3443746 | A1 | 2/2019 |

OTHER PUBLICATIONS

Decoder-Side Motion Vector derivation with switchable template matching; Jul. 2010. (Year: 2010).*
International Search Report and Written Opinion dated Aug. 3, 2023, issued in application No. PCT/CN2023/088940.

* cited by examiner

EXTENDED TEMPLATE MATCHING FOR VIDEO CODING

CROSS REFERENCE TO RELATED PATENT APPLICATION(S)

The present disclosure is part of a non-provisional application that claims the priority benefit of U.S. Provisional Patent Application No. 63/332,292, filed on 19 Apr. 2022. Content of the above-listed application is herein incorporated by reference.

TECHNICAL FIELD

The present disclosure relates generally to video coding. In particular, the present disclosure relates to using template matching for coding video blocks.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

Versatile video coding (VVC) is the latest international video coding standard developed by the Joint Video Expert Team (JVET) of ITU-T SG16 WP3 and ISO/IEC JTC1/SC29/WG11. The input video signal is predicted from the reconstructed signal, which is derived from the coded picture regions. The prediction residual signal is processed by a block transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In VVC, a coded picture is partitioned into non-overlapped square block regions represented by the associated coding tree units (CTUs). The leaf nodes of a coding tree correspond to the coding units (CUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

A CTU can be partitioned into one or multiple non-overlapped coding units (CUs) using the quadtree (QT) with nested multi-type-tree (MTT) structure to adapt to various local motion and texture characteristics. A CU can be further split into smaller CUs using one of the five split types: quad-tree partitioning, vertical binary tree partitioning, horizontal binary tree partitioning, vertical center-side triple-tree partitioning, horizontal center-side triple-tree partitioning.

Each CU contains one or more prediction units (PUs). The prediction unit, together with the associated CU syntax, works as a basic unit for signaling the predictor information. The specified prediction process is employed to predict the values of the associated pixel samples inside the PU. Each CU may contain one or more transform units (TUs) for representing the prediction residual blocks. A transform unit (TU) is comprised of a transform block (TB) of luma samples and two corresponding transform blocks of chroma samples and each TB correspond to one residual block of samples from one color component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU.

For each inter-predicted CU, motion parameters consisting of motion vectors, reference picture indices and reference picture list usage index, and additional information are used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU. The alternative to merge mode is the explicit transmission of motion parameters, where motion vector, corresponding reference picture index for each reference picture list and reference picture list usage flag and other needed information are signalled explicitly per each CU.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for using extended templates to refine motion vectors. A video coder generates a template for a current block based on an average of prediction samples in first and second reference pictures referenced by first and second motion vectors. The template and the current block may be different in size or shape. The video coder searches the first reference picture to refine the first motion vector based on a matching cost between samples referred by the refined first motion vector and the samples of the template. The video coder searches the second reference picture to refine the second motion vector based on a matching cost between samples referred by the refined second motion vector and the samples of the template. The video coder uses the refined first and second motion vectors to encode or decode the current block.

In some embodiments, the template and the current block are different in size or shape. In some embodiments, the template is a mixed template that includes a first section based on reconstructed samples neighboring the current block in the current picture and a second section based an average of the initial prediction samples from the first reference picture and the initial prediction samples from the second reference picture. The template may correspond to an area in the current picture that encompass the first current block, or an area in the current picture that is a sub-portion of the current block, or an area in the current picture that is partly inside the current block and partly outside the current block, wherein current block is partly outside of the area.

The video coder may signal or receive a selection of a configuration from multiple possible configurations for the template, and the template is generated according to the selected configuration. The video coder may also scale the refined motion vectors according to a format of a chroma component and use the scaled motion vectors to fetch prediction samples of the chroma component.

In some embodiments, the template has two or more different template sections, and the video coder refines the first motion vector by computing a cost of the refined first motion vector based on weights assigned to the different template sections. In some embodiments, the template includes a first template section and a second template section. The first template section is used to generate a first candidate refinement of the first motion vector and the second template section is used to generate a second candidate refinement of the first motion vector. The video coder then refines the first motion vector based on the first and second candidate refinements (e.g., by selecting one of the first and second candidate refinements based on cost).

In some embodiments, the video coder refines the first and second motion vectors by iteratively updating the first and second motion vectors according to the template and regenerating the template based on the updated first or second motion vectors. In some of these embodiments, the template is regenerated based on the updated first motion vector and the regenerated template is used to update the second motion vector.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Refining Motion Vectors by Template Matching

Template matching (TM) is a method used for refining the motion vectors (MVs) to generate a more accurate prediction for the current block (e.g., CU). Template matching is performed to refine a MV by both encoder and decoder by searching already reconstructed/decoded pixels or samples.

Figure 1A:
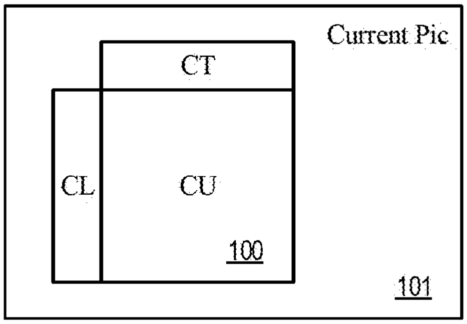
FIGS. 1A-B illustrate motion vector refinement by template matching for a current block in a current picture.
Figure 1B:
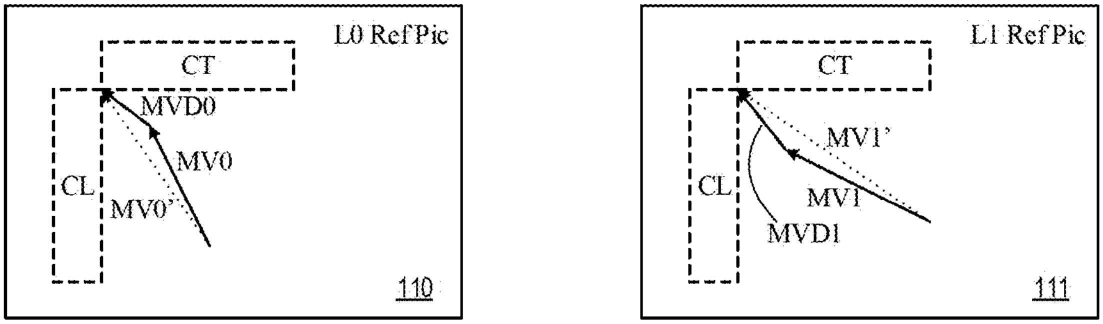
Figure 2:
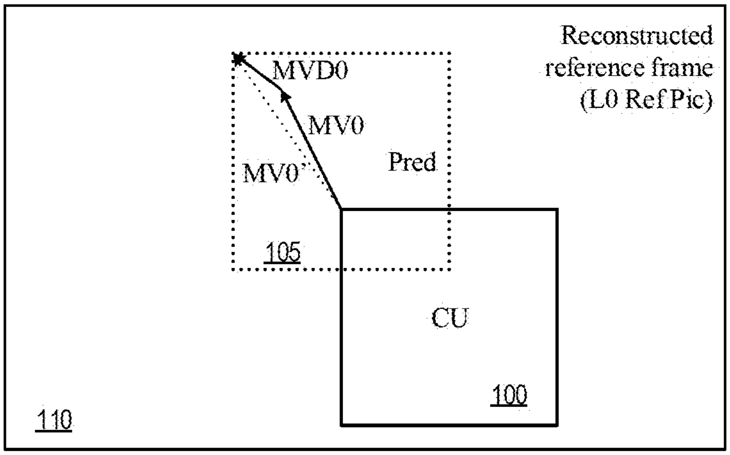
FIG. 2 conceptually illustrates fetching the prediction data based on a refined motion vector (MV) for the current block.

FIGS. 1A-B illustrate motion vector refinement by template matching for a current block 100 in a current picture 101. Neighboring regions above and left of the current block are used as templates CT and CL, respectively. The above (CT) and left (CL) templates are used as the searching anchor and the CU portion is not involved because the current block 100 has not been reconstructed/decoded yet. For the CU 100, two MVs (MV0 and MV1) are encoded in the bitstream and decoded for the CU to find the prediction data from the reference frames. MV0 is refined by searching a L0 reference frame 110 within a certain search range of MV0. MV1 is refined by searching a L1 reference frame 111 within a certain range of MV1. This refinement can be regarded as to get a MV difference and adding this MVD to the original MV. In actual implementation, multiple MVDs are searched. Original MV0 and MV1 are used as the starting points and the MVD with the lowest sum of absolute differences (SADs) is used to get the final refinement result. In the example, MVD0 is added to MV0 to obtain MV0' and MVD1 is added to MV1 to obtain MV1'. The refined MVs, MV0' and MV1', are then used to fetch the prediction data (Pred) from the corresponding reference frames 110 and 111. FIG. 2 conceptually illustrates fetching the prediction data 105 (Pred) based on the refined motion vector MV0' for the current block 100.

Using neighboring templates (CT and CL) for MV refinement has data dependency issues because the MV refinement process can start only after the search templates CT and CL become available, even though both MV0 and MV1 have already been decoded and are ready for refinement. For generating templates without data dependency, a bilateral template can be generated as the weighted combination of the two prediction blocks referred by MV0 and MV1 in list0 and list1 reference pictures.

Figure 3:
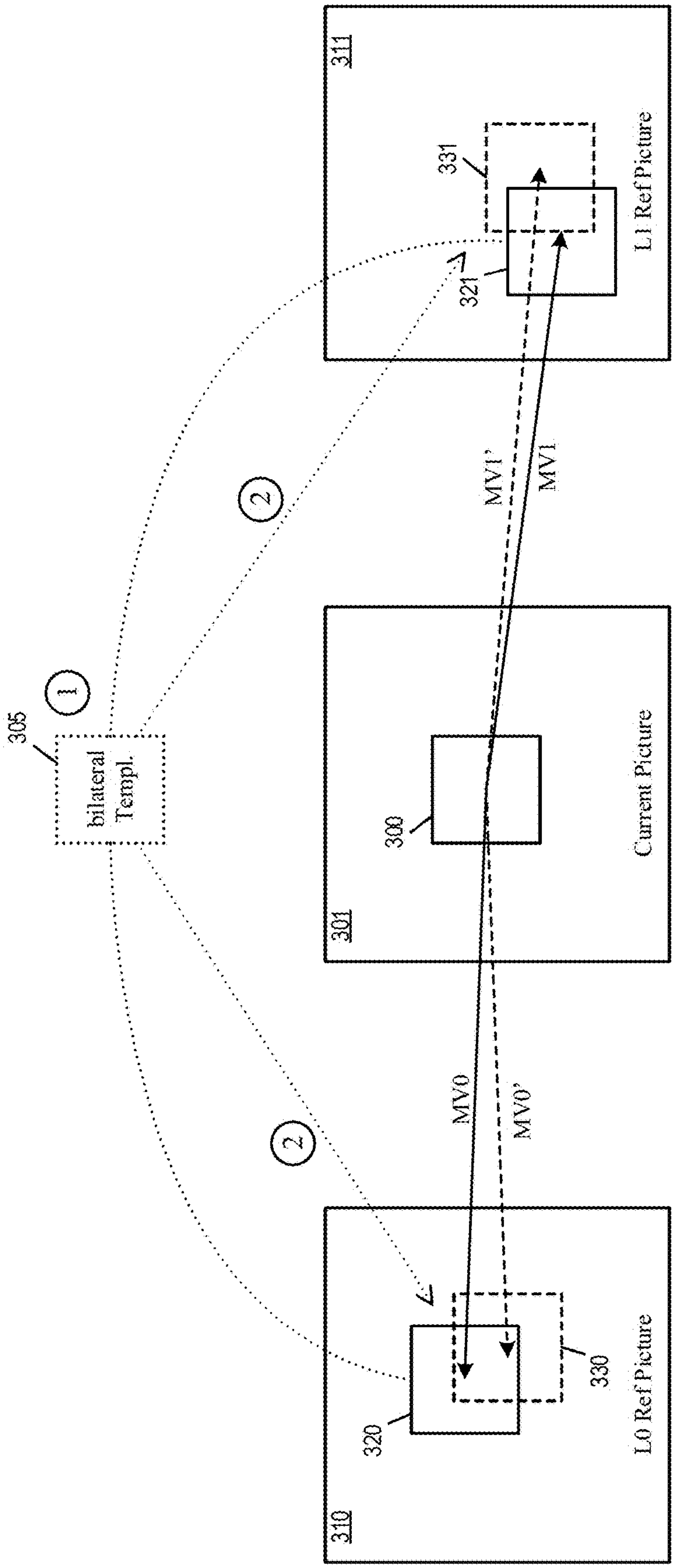
FIG. 3 conceptually illustrates using a bilateral template to refine two motion vectors.

FIG. 3 conceptually illustrates using a bilateral template to refine two motion vectors. At operations labeled '1' (bilateral template generation), a bilateral template 305 is generated by blending (i) an initial prediction block 320 in the L0 reference picture 310 referenced by initial MV0 and (ii) an initial prediction block 321 in the L1 reference picture 311 referenced by initial MV1. At operations labeled '2' (template matching), cost measures (template costs) are calculated between the generated template 305 and a sample region 330 around the L0 initial prediction block 320 and a sample region 331 around the L1 initial prediction block 321. For each of the two MVs, searches around the initial MV/prediction block are performed to update the MV to minimize the template cost. In some embodiments, the sum of absolute differences (SAD) is utilized as the template cost. Finally, the two finally updated MVs, i.e., MV0' and MV1' are used as the refined MVs for regular bidirectional (Bi-) prediction of the current block 300.

II. Using Templates without Data Dependency

A. Average Reference Templates

In some embodiments, a process of averaging reference templates is used to refine MV0 and MV1, instead of using neighboring templates (e.g., CT and CL). This removes the data dependency to the reconstrued pixels in the neighboring templates. The MV refinement processing can therefore start as soon as the MV0 and MV1 are decoded from the bitstream.

Figure 4A:
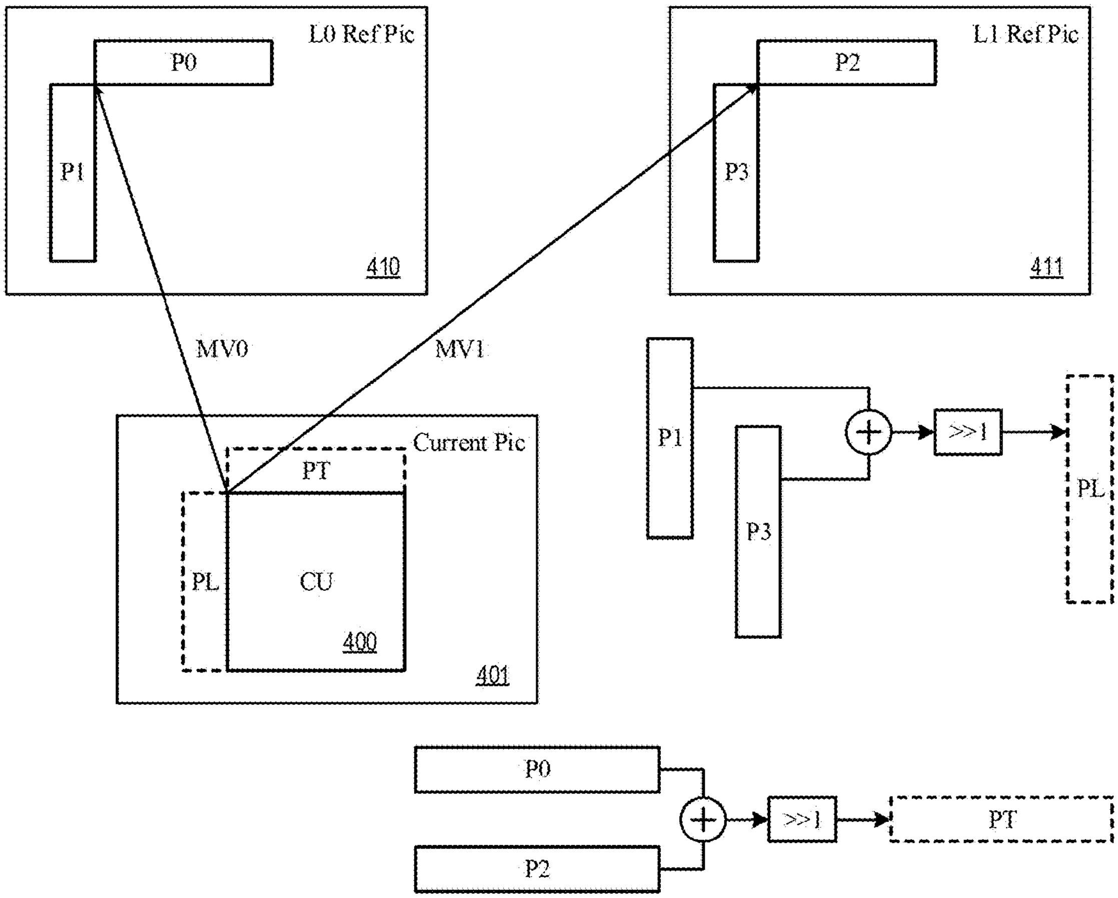
FIGS. 4A-B conceptually illustrate generating templates for refining motion vectors by averaging reference samples from different reference pictures.
Figure 4B:
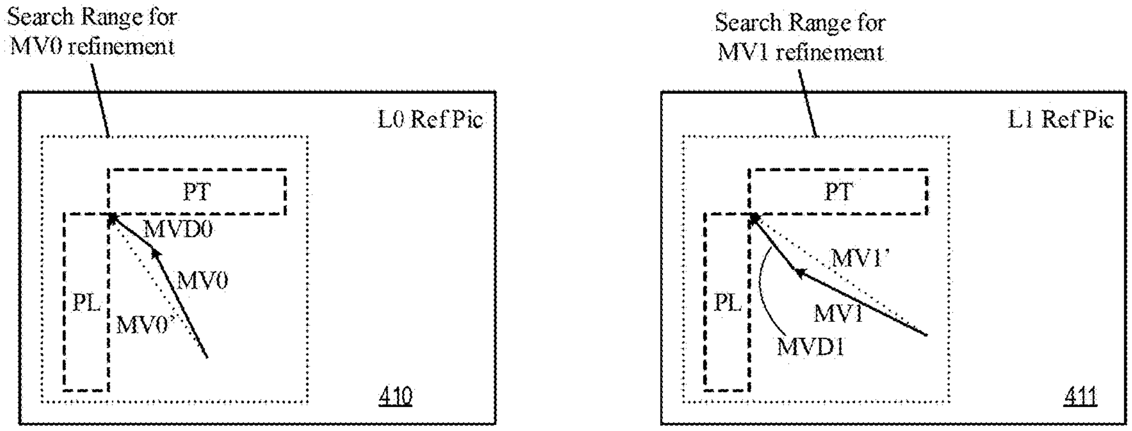

FIGS. 4A-B conceptually illustrate generating templates for refining motion vectors by averaging reference samples from different reference pictures. A current block 400 in a current picture 401 has motion vectors MV0 and MV1. FIG. 4A shows MV0 being used to fetch reference samples in rectangles P0 and P1 from a reference picture or frame 410 as reference samples, and MV1 being used to fetch reference samples in rectangles P2 and P3 from a reference picture or frame 411. An above template (or template section) PT is generated by averaging P0 and P2. A left template (or template section) PL is generated by averaging of P1 and P3. The generated templates PT and PL (average reference template) can be used as the templates for the MV refinement. The averaging of the reference samples from L0 and L1 reference picture can be weighted. The blending or averaging weights of the two sets of reference samples may or may not be equal (e.g., 0.5:0.5, or 0.75:0.25, or 0.25:0.75, etc.)

FIG. 4B illustrates using the average reference templates PT and PL to refine motion vectors. In the example, a range in the reference picture 410 is searched to update/refine MV0 to minimize the cost between templates PT+PL and their corresponding reference samples identified by the updated MV0. A range in the reference picture 411 is searched to update/refine MV1 to minimize the cost between templates PT+PL and their corresponding reference samples identified by the updated MV1. The refined MVs (MV0' and MV1') are then used to fetch the prediction samples from their respective reference frames 410 and 411 for reconstructing and decoding current CU.

B. Arbitrarily Shaped Templates

Figure 5:
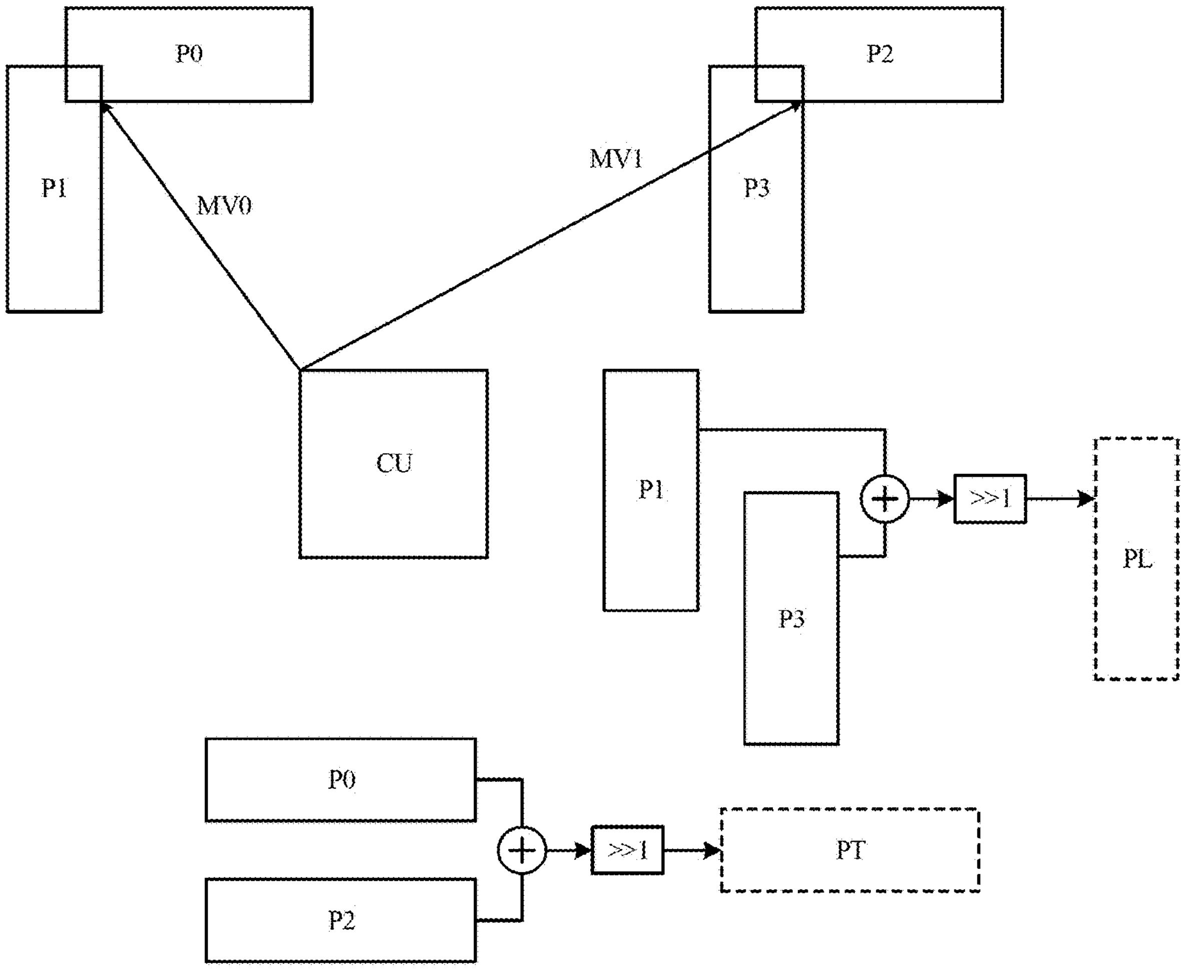
FIG. 5 shows enlarging the averaging of templates for MV refinement.
Figure 6A:
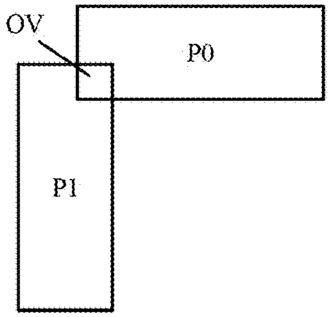
FIG. 6A shows neighboring rectangular templates with overlapped area.
Figure 6B:
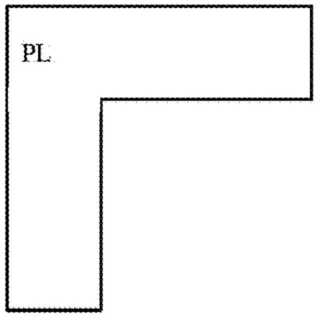
FIG. 6B shows an L-shaped template for MV refinement.

In some embodiments, the areas of the average reference templates (PT and PL) can be extended to be larger. However, directly enlarging the two rectangles (e.g., PT and PL) may result in overlap of the templates. This overlap may bias the cost computation of SAD because the overlapped part contributes to the SAD twice. FIG. 5 shows enlarging the averaging of templates for MV refinement. FIG. 6A shows neighboring rectangular templates with overlapped area. An enlarged average reference template may also be without overlap, for example, by merging PT and PL into one contiguous L-shape. FIG. 6B shows an L-shaped template for MV refinement.

By extending the template shape, it is possible to construct different shapes of the average reference templates for the MV refinement for seeking further coding gain. The above-mentioned template extension method can be applied to arbitrary shapes of templates, though the extension may be bounded by the availability of the pixels in the reference frames.

Figure 7A:
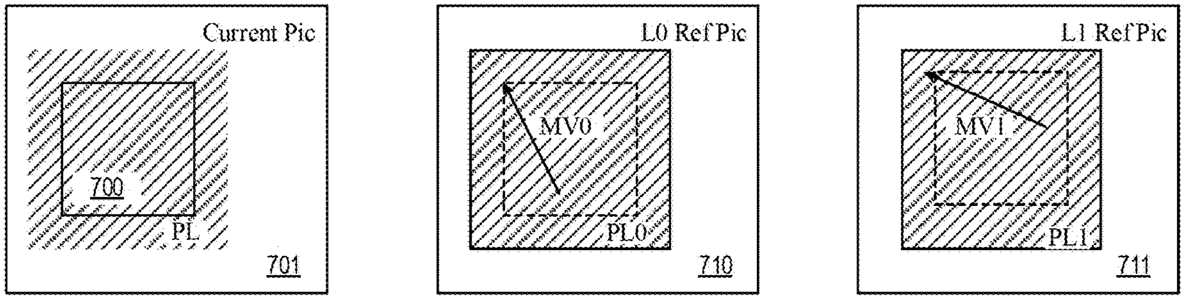
FIGS. 7A-C conceptually illustrate some examples of arbitrarily shaped average reference templates.
Figure 7B:
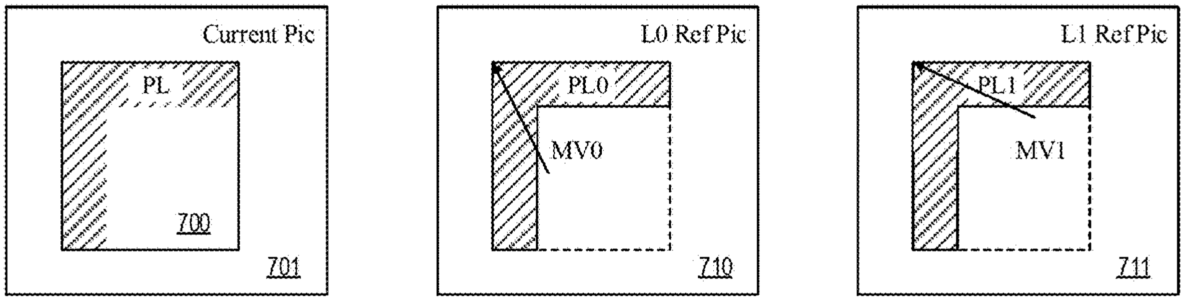
Figure 7C:
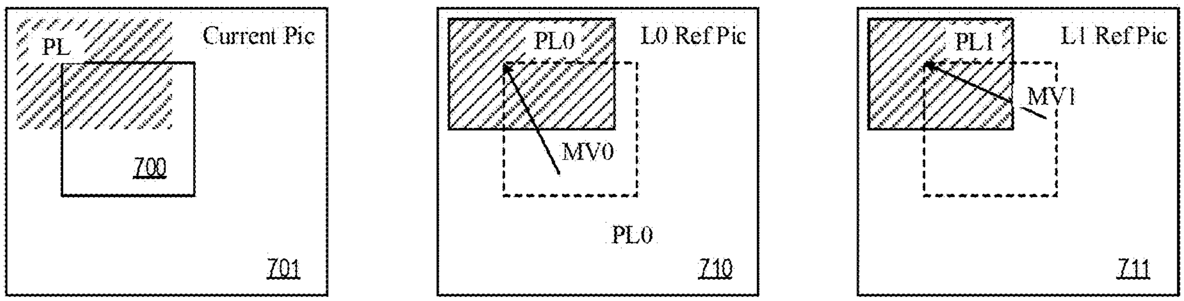

FIGS. 7A-C conceptually illustrate some examples of arbitrarily shaped average reference templates. A current block 700 has an initial motion vector MV0 that refers to prediction samples of an area PL0 in a L0 reference picture 710, and an initial motion vector MV1 that refers to prediction samples of an area PL1 in a L1 reference picture 711. The samples of PL0 and PL1 are averaged to generate an average reference template PL. The template PL is used to search for the best matching samples in the reference pictures 710 and 711 in order to refine MV0 and MV1. The template PL may correspond to an area of any arbitrary shape and size at any arbitrary position relative to the current block 700 in the current picture 701.

FIG. 7A shows the PL corresponding to an area that entirely encompass the current block 700 and beyond. FIG. 7B shows the PL corresponding to an area (an L-shape) that is a sub-portion of the current block 700, while parts of the current block 700 is outside of the PL area. FIG. 7C shows the PL corresponding to an area that is partly within the current block and partly outside of the current block, while at least a part of the current block 700 is outside of the PL area.

In some embodiments, the shape of the average reference template can be determined based on the statistics or features of the luma and/or chroma and/or neighboring MV information. In some embodiments, the blending ratio or weights of the two sets of reference samples for generating the average reference template can be altered based on the statistics and/or features of the luma and/or chroma and/or neighboring MV information.

C. Mixed Templates

When samples in reference pictures are used to generate templates for MV refinement, the data dependency is removed. Therefore, MV refinement may start earlier (e.g., before complete reconstruction of above and left neighbors). The method is suitable for low-delay coding scenarios. For cases in which the decoding delay is not the main concern, higher coding gain may be the major goal. In some embodiments, neighboring template and average reference template may be used jointly to form a mixed or combined template for further boosting the coding gain.

Figure 8A:
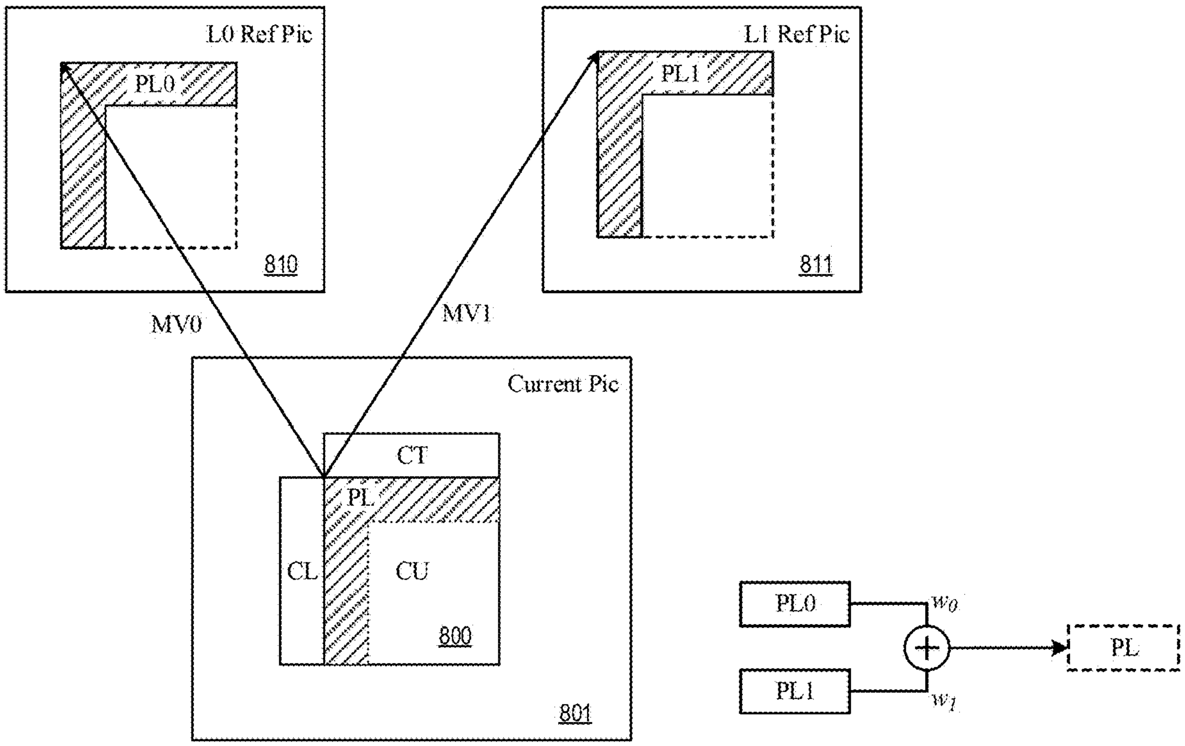
FIGS. 8A-B conceptually illustrate mixing neighboring templates with average reference templates for MV refinement.
Figure 8B:
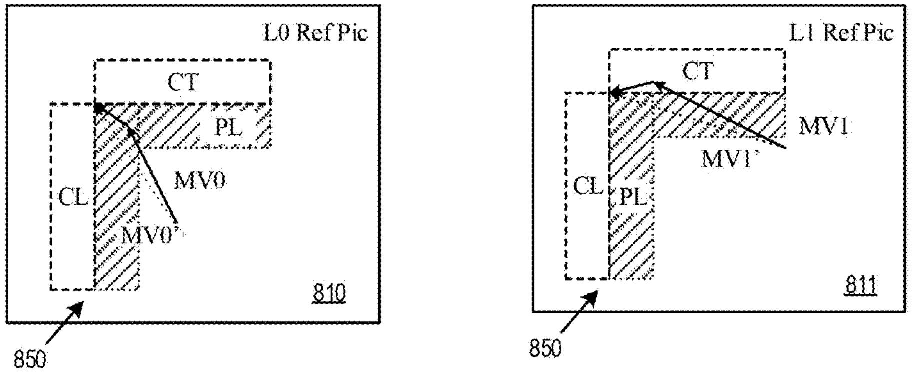

FIGS. 8A-B conceptually illustrate mixing neighboring templates with average reference templates for MV refinement. FIG. 8A shows the construction of a mixed template. The figure illustrates neighboring templates CT and CL that are identified from reconstructed pixels neighboring a current block 800 in a current picture 801. The figure also illustrates an L-shape template PL for the current block 800 that is the average of reference samples in reference pictures 810 (referenced by MV0) and 811 (referenced by MV1). The samples referenced by MV0 in the reference pictures 810 is a corresponding L-shape labeled PL0. The samples referenced by MV1 in the reference pictures 811 is a corresponding L-shape labeled PL1. The samples of PL0 and PL1 may be available for fetching before the samples of the neighboring templates CT and CL are reconstructed. The fetched samples of PL0 and PL1 are averaged to become the average reference template PL.

FIG. 8B illustrates using the mixed template to refine motion vectors. The figure shows the template PL, CT, and CL being used as different sections of a mixed or combined template 850 to refine MV0 and MV1 of the current block 800. By using this mixed template 850 to search for better matching samples in the reference pictures 810 and 811, the refined MVs (MV0' and MV1') for generating the final prediction data may result in a better coding gain for the current block.

In some embodiments, the area of an average reference template may extend to cover the whole CU area, or beyond. Likewise, the area of a mixed template (including both reconstructed neighbor template sections and average reference template sections) may also exceed the right and bottom side of the current block.

Figure 9A:
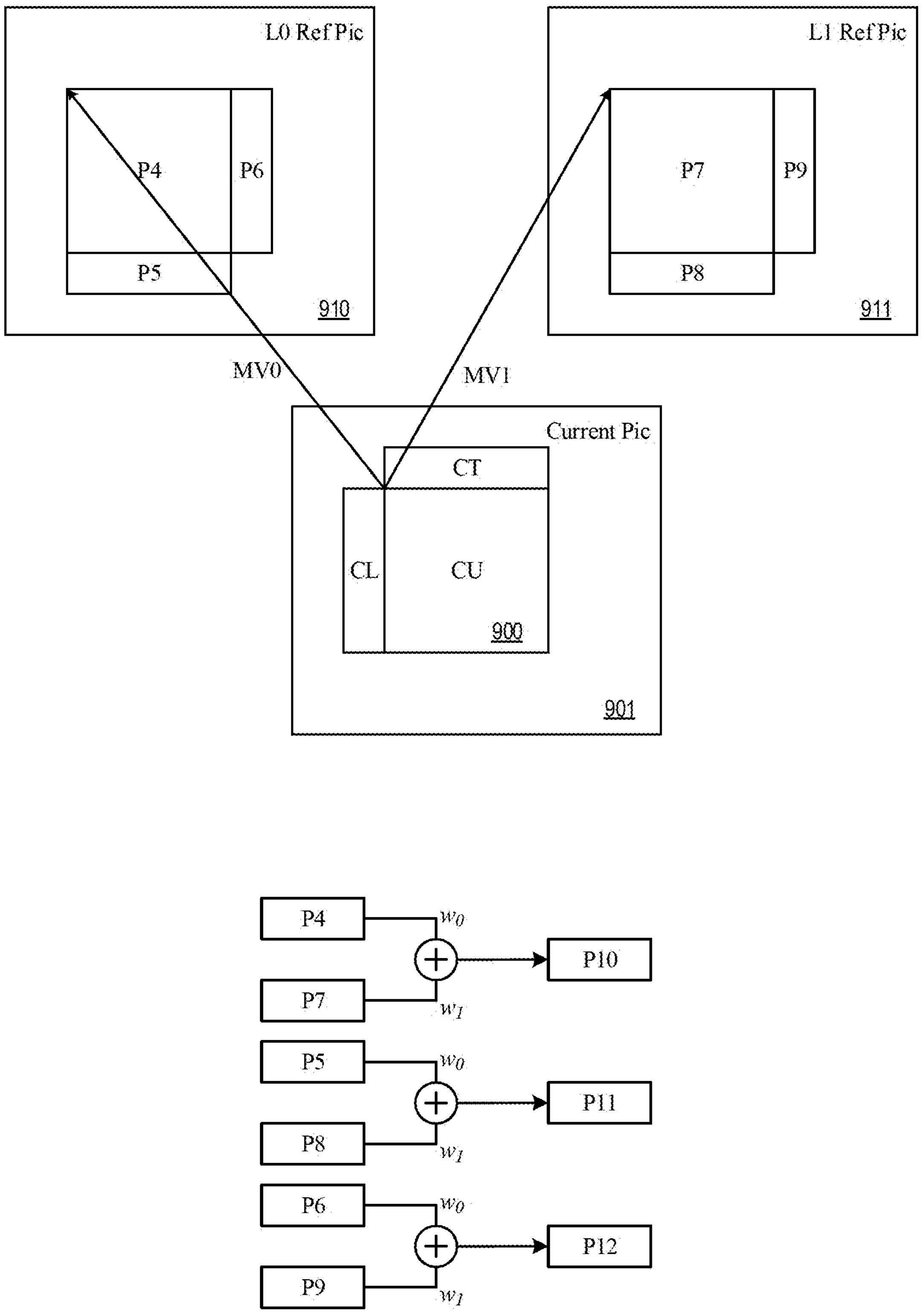
FIGS. 9A-B illustrate an extended average reference template that is larger than a current block.
Figure 9B:
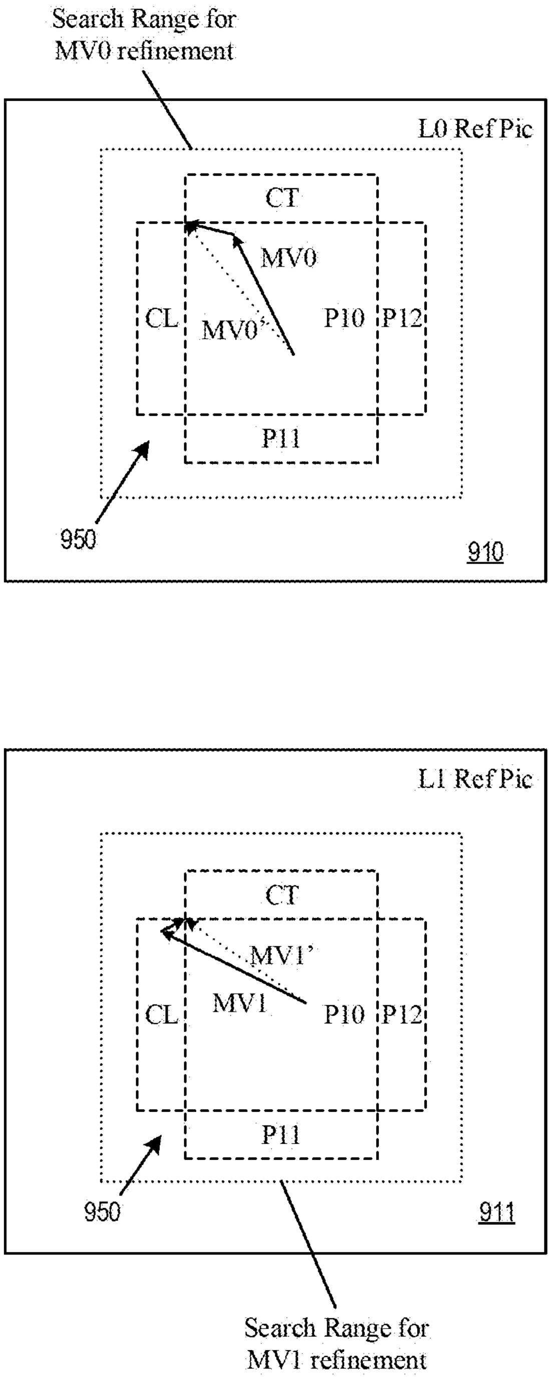

FIGS. 9A-B illustrate an extended average reference template that is larger than a current block. FIG. 9A shows a current block 900 having MV0 that references a reference frame 910 and MV1 that references a reference frame 911. MV0 references a block P4 in the reference frame 910 and MV1 references a block P7 in the reference frame 911. An average reference template P10 is computed for the current block 900 by averaging P4 and P7.

The reference block P4 has a bottom extension P5 and a right extension P6. The reference block P7 has a bottom extension P8 and a right extension P9. The average of P5 and P8 is used as a bottom extension P11 of the current block. The average of P6 and P9 is used as right extension P12 of the current block. FIG. 9B shows a combined/mixed template 950 that includes P10, P11, P12, CL, and CT (neighboring templates of the current block). The combined template 950 can be used to refine MV0 by searching for matching samples in the reference picture 910, and to refine MV1 by searching for matching samples in the reference picture 911.

More generally, the mixed template 950 can be any combination of (i) reconstructed pixels in the current frame as some portions of the template (e.g., CL, CT) and (ii) average of pixels from the reference frames as some other portions of the template (e.g., P10, P11, P12).

D. Sub-Sampling Template

By enlarging the template (may even exceed the CU size), the memory bandwidth required for MV refinement may increase significantly. When decoding high resolution video for playback, it is desirable to limit memory bandwidth to a reasonable level while boosting or maintaining coding gain. In some embodiments, when using a template to refine MVs, the template is sub-sampled to reduce or limit the memory bandwidth requirement.

Figure 10:
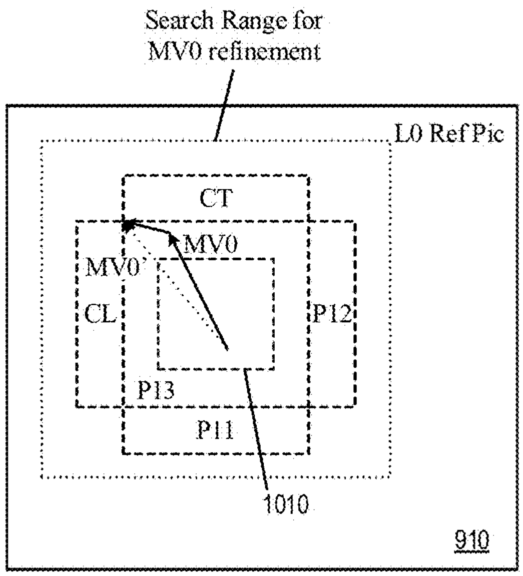
FIG. 10 illustrates a sub-sampled template created by cropping out the center region of the current block.

In some embodiments, the video coder sub-samples the template by cropping out a portion of the CU, e.g., the center region of the CU. FIG. 10 illustrates a sub-sampled template created by cropping out the center region of the current block 900. As illustrated, an average reference template P13 is derived for the current block 900 based on MV0 reference block P4 and MV1 reference block P7. The template P13 corresponds to the current block 900 but with a center area 1010 cropped out. Therefore, when calculating the SAD between the mixed template of CL+CT+P11+P12+P13 versus the corresponding area in reference pictures 910 and 911 referred by current refined MVs (MV0' and MV1'), this center 1010 is not accessed. The bandwidth of the memory access can be saved by skipping pixel retrieval for the area.

In some embodiments, when calculating the cost for refining the motion vectors, the different portions of the mixed template can be weighed differently according to their respective sourcing pixels. For example, the templates of reconstructed neighboring pixels (e.g., CL, CT) can be assigned a first weight and the templates of averaged reference samples (e.g., P11, P12, P13) can be assigned a second, different weight.

Other sub-sampling method can also be used for saving the memory bandwidth, e.g., by only keeping the even rows of the template for the cost search of MV refinement. Multiple sub-sampling methods can be applied for achieving the balancing between memory bandwidth requirement and the accuracy for MV refinement for coding gain.

E. Weighting Different Template Sections for Cost Calculation

Figure 11:
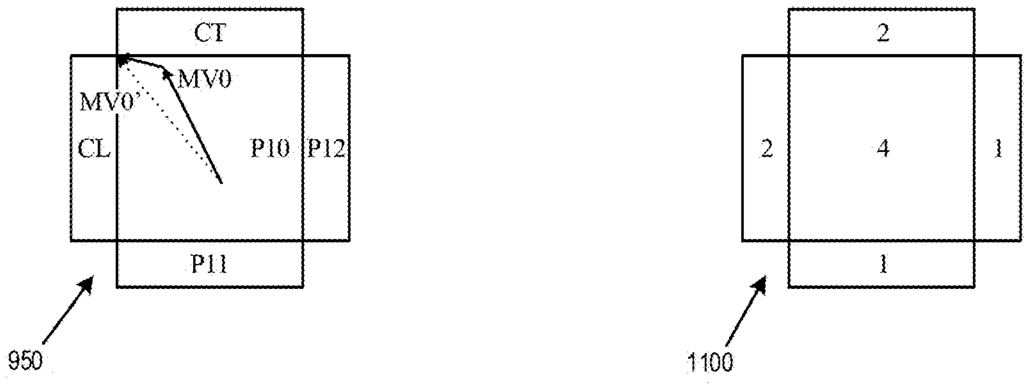
FIG. 11 illustrates different template sections being weighted differently for calculating the cost for MV refinement.

In some embodiments, a weight mask is used to scale the SAD contribution from different parts or sections of the template, i.e., different parts of the template are weighted differently when calculating the cost for refining MVs. FIG. 11 illustrates different template sections being weighted differently for calculating the cost for MV refinement.

As illustrated, a weight mask 1100 is used to weight different parts of the combined template 950 (CL+CT+P10+P11+P12) for the current block 900. In the example, the weighting coefficients are 2 for CL and CT, 4 for P10, 1 for P11 and P12. The weighting mask is used to fine tuning the influence of SAD from different part of the template. The weighting coefficients of the mask can be pre-defined therefore no extra bits required to be signaled from encoder to decoder. Otherwise, the weighting coefficients can be signaled by transmitting extra syntax elements.

F. Set of Templates

Figure 12A:
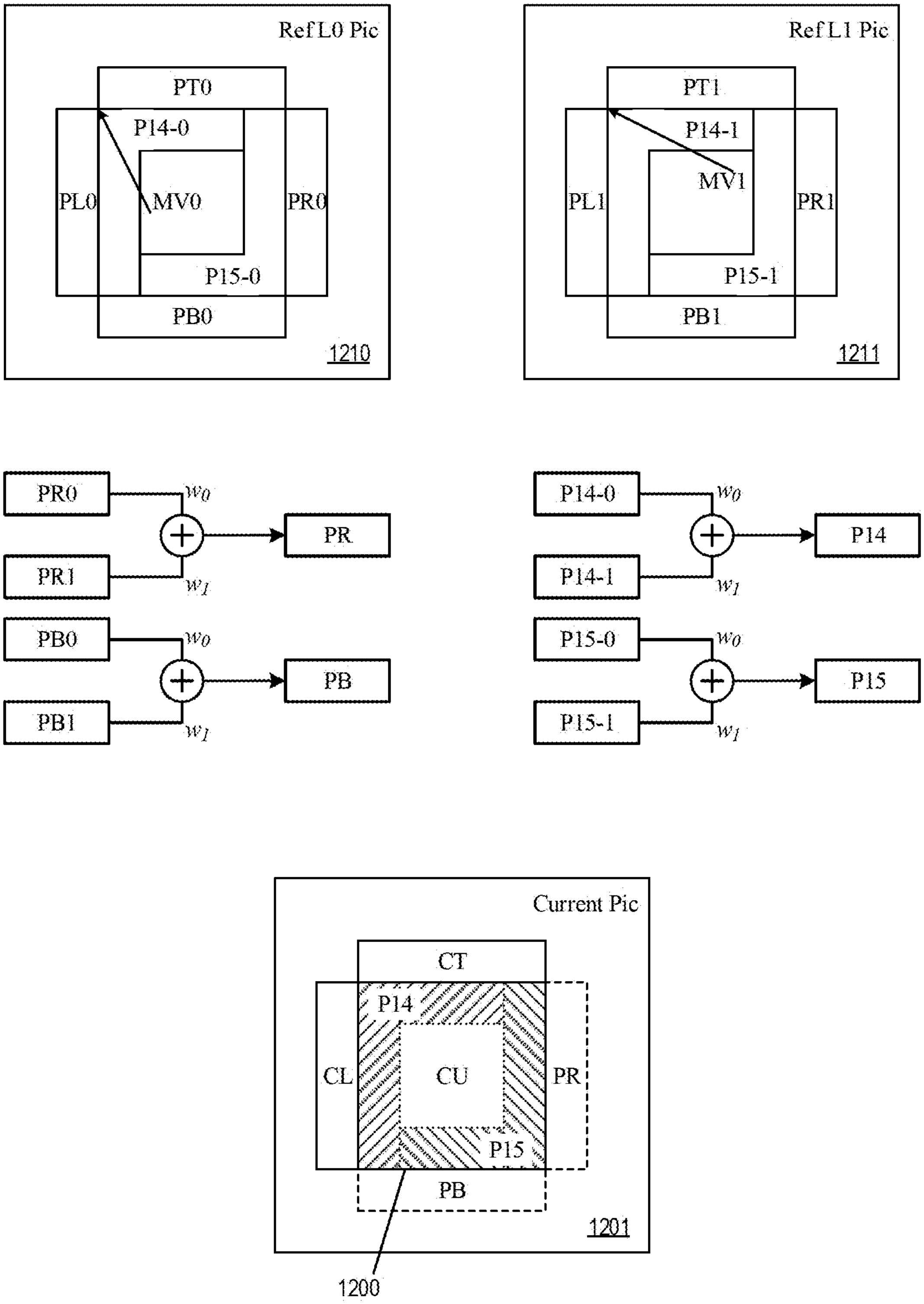
FIGS. 12A-C conceptually illustrate MV refinement by jointly considering multiple templates.
Figure 12B:
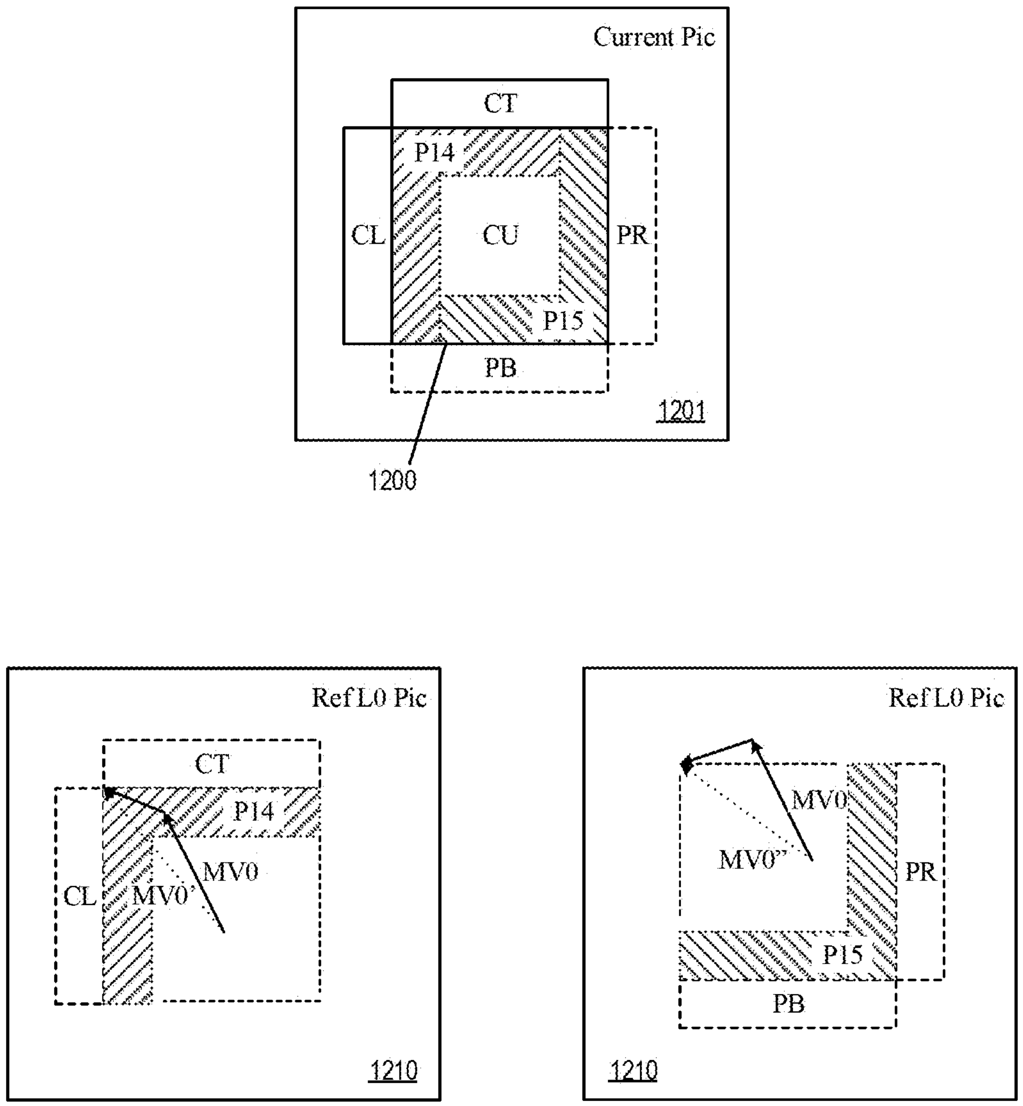
Figure 12C:
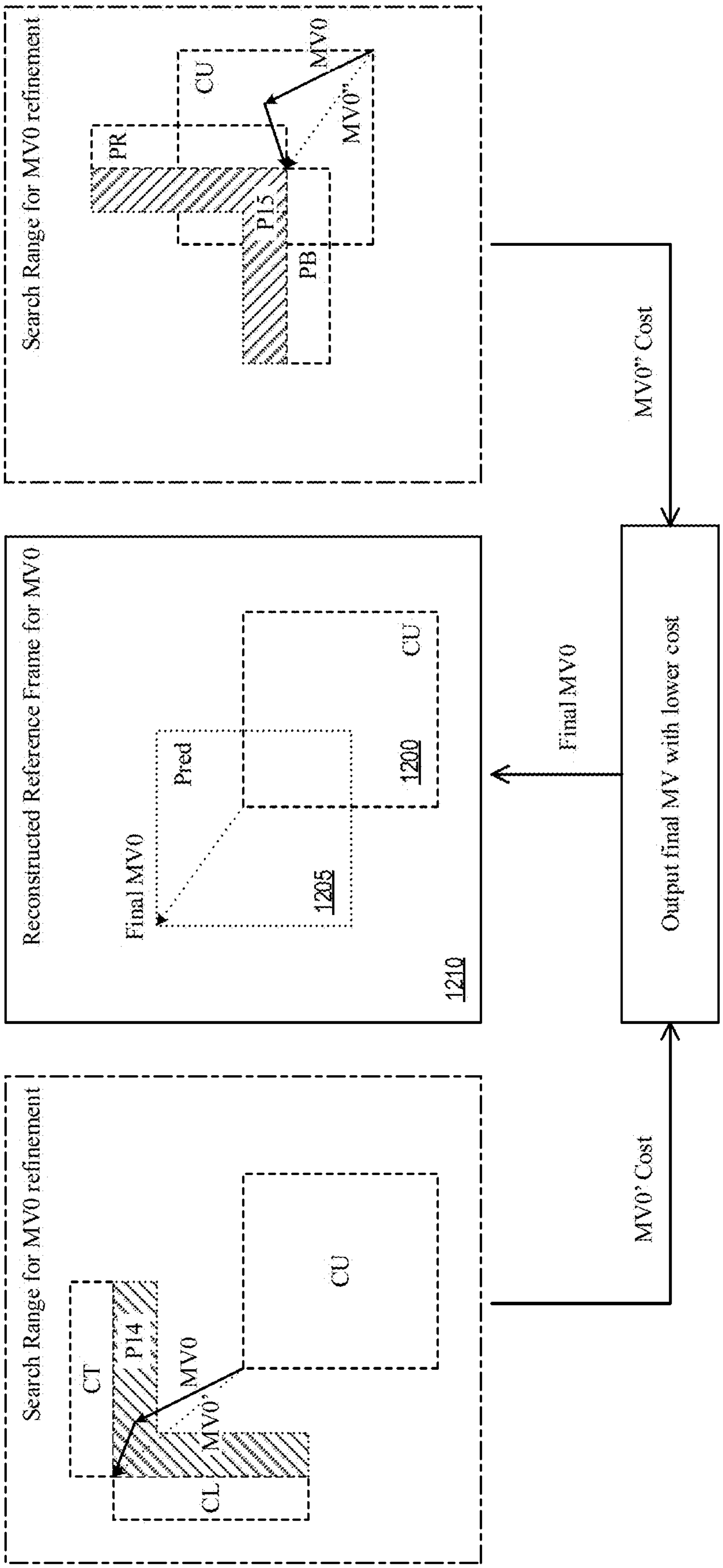

In some embodiments, multiple templates are used to derive the final refined MV. FIGS. 12A-C conceptually illustrate MV refinement by jointly considering multiple (sets of) templates. For a current block 1200 in a current picture 1201, the figure illustrates two (sets of) templates being used to refine an original MV (MV0). The first set of templates includes reconstructed neighboring templates CL and CT for the current block 1200 as well as average reference L-shaped template P14. A second set of templates includes average reference templates PR, PB, and P15 (L-shaped). (The reconstructed neighboring templates CL and CT can be replaced by average reference plates.)

FIG. 12A shows the generation of the average reference templates PR, PB, P14, P15. These templates are generated by averaging corresponding samples in a L0 reference picture 1210 referred by MV0 and a L1 reference picture 1211 referred by MV1.

FIG. 12B shows motion search being conducted for both the first set of templates (CL+CT+P14) and for the second set of templates (PR+PB+P15), against a search range referenced by the initial MV0 in the L0 reference picture 1210. The motion search using the first set of templates (CL+CT+P14) in the reference picture 1210 produces a first refined MV (MV0'). The motion search using the second set of templates (PR+PB+P15) in the reference picture 1210 produces a second refined MV (MV0"). The video coder may then select from one of the two refined MVs based on which has lower cost.

FIG. 12C shows the selection from one of the two refined MVs based on which has lower cost. In the figure, a final MV0 is derived from the two refined MVs, e.g., by selecting either MV0' or MV0" as the final MV based on the costs of the two refined MVs. The final MV0 is then used to fetch a predictor 1205 (Pred) in the reconstructed reference frame 1210.

The multi-template method described herein is beneficial for some CUs that are more similar to certain neighbors (e.g., the above and left neighbors versus the right and bottom neighbors). Additional coding gain may be achieved by adopting more templates for CU with different characteristics and comparing the corresponding refinement costs from the multiple different templates for outputting a final MV with lowest cost. For example, in some embodiments, the templates of FIG. 10 and FIG. 12 may be jointly considered to produce two refined MVs for one given initial MV, and the video coder may select one of the two refined MVs as the final refined MV based on which has lower cost.

In some embodiments, even more (e.g., more than two) templates or sets of templates, including templates derived from pixels of the current reconstrued neighborhood and templates derived from averaging-type templates, can be mixed to construct a template group for searching for the final refined MV with lowest cost. In some of these embodiments, no additional syntax element is required to decide the final refined MV.

In some embodiments, there can be multiple refined MVs generated by multiple (sets of) templates. The multiple refined MVs can be used to fetch multiple different predictions for the CU, and the CU's prediction is formed by blending the prediction samples fetched based on the multiple refined MVs. The blending weights can be equal for the different refined MVs. The blending weights of the different refined MVs can also be determined based on their corresponding already calculated costs.

G. Template Refinement for Chroma

In some embodiments, the original MV0 and MV1 for the luma component can be adopted for the chroma components, by e.g., scaling the MVs from luma to chroma according to the format of the chroma component. The video coder may then use the scaled MVs to fetch chroma component's prediction data from the reference frames' chroma buffer.

In some embodiments, methods described in Sections II-A through II-F above can also be used for the coding of both luma and chroma components. However, motion search in chroma components may increase the memory bandwidth requirement. In some embodiments, MV refinement is only performed for luma, while the cost of the MV refinement for chroma is determined by blending the refinement cost from luma and chroma with a certain ratio. The cost for refining MV for chroma can be the SAD calculated by the template and referring pixels of chroma according to the scaled MV from luma (in this method, only MV for luma is available).

H. Implicit and Explicit Signaling for MV Refinement by Template

Methods described in Section II involve constructing additional templates for lowest cost search for MV refinement. The extra templates result in computation burden for the decoder to perform the motion search based on the extra/extended templates. To reduce the burden, additional index flags can be signaled to explicitly select a specific template or a specific set of templates from all possible templates that can be used for encoding or decoding processes. The flags can be signaled at block level (coding unit) or at a higher syntax level such as SPS, PPS, picture, or slice header.

J. Template Regeneration

As mentioned above, the video coder may generate and use average reference template(s) to refine a motion vector. The video coder may generate the template (or templates) by using (e.g., blending) pixels referenced by MV0 and MV1, then use the generated templates to refine both MV0 and MV1.

In some embodiments, the video coder may generate an initial template (or templates) by using (e.g., blending) pixels referenced by MV0 and MV1. The video coder then uses the initial template to refine MV0 to obtain MV0'. The video coder then re-generates the template(s) by using pixels referenced by MV0' and MV1. The regenerated template(s) is then used to refine MV1.

In some embodiments, there can be multiple iterations of MV refinement. Each iteration refines the current MV0 and MV1 pair once. In each iteration, MV0 and MV1 can be refined by either (i) using the average reference template to refine both MV0 and MV1 or (ii) using the average reference template to refine MV0 into MV0', then regenerate the template using MV0' and MV1 to refine MV1. In some embodiment, in each iteration, whether the two MVs are refined by (i) or (ii) may be determined by a predefined order or based on statistics of neighborhood information of the CU and/or its reference frames. In some embodiments, iterations in which the two MVs are refined by (i) are interleaved with iterations in which the two MVs are refined by (ii).

Any of the foregoing proposed methods can be implemented in encoders and/or decoders. For example, any of the proposed methods can be implemented in a module for MV refinement of an encoder and/or a decoder. Alternatively, any of the proposed methods can be implemented as a circuit coupled to a module for MV refinement of the encoders and/or the decoders.

III. Example Video Encoder

Figure 13:
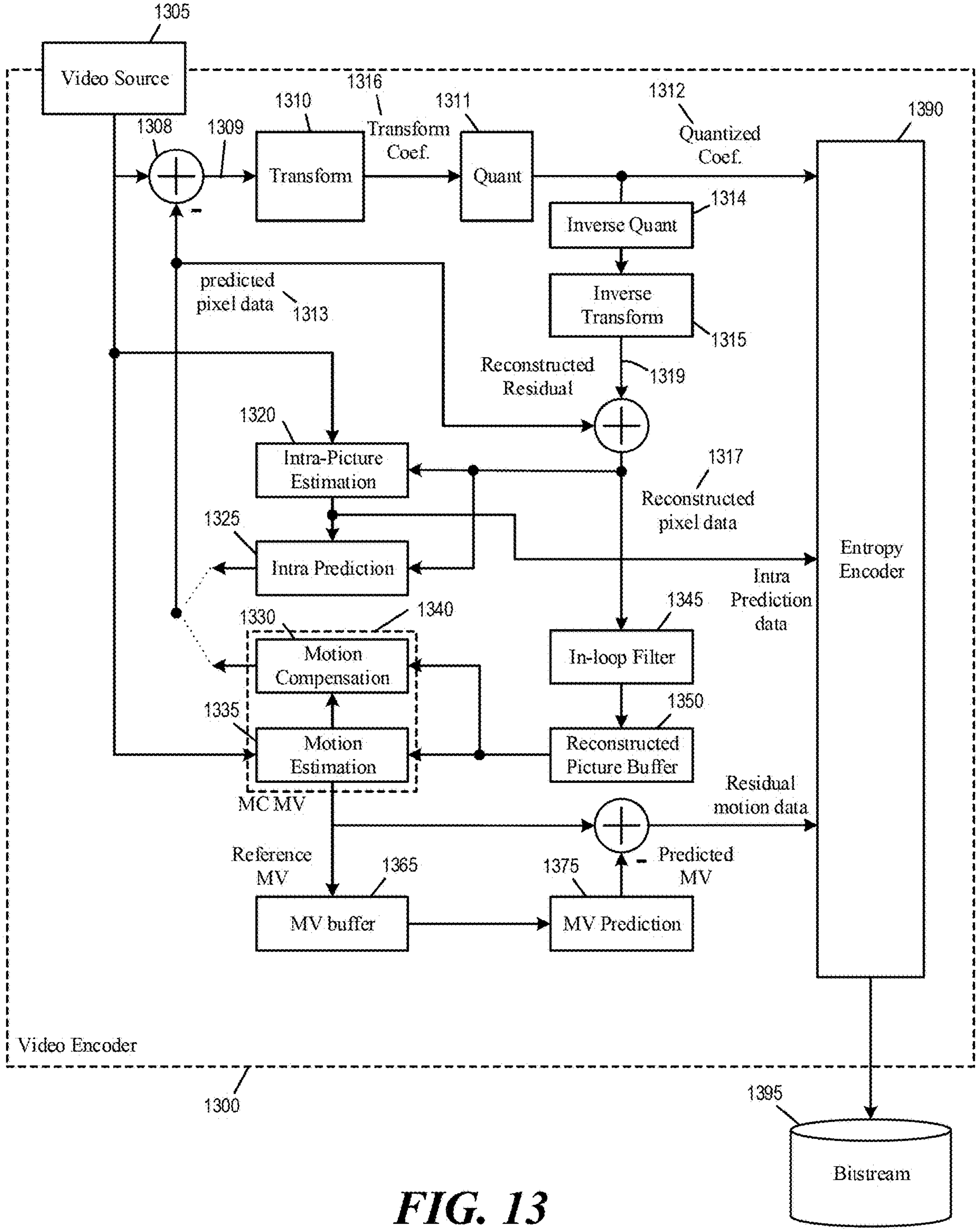
FIG. 13 illustrates an example video encoder that may perform motion vector refinements.

FIG. 13 illustrates an example video encoder 1300 that may perform motion vector refinements. As illustrated, the video encoder 1300 receives input video signal from a video source 1305 and encodes the signal into bitstream 1395. The video encoder 1300 has several components or modules for encoding the signal from the video source 1305, at least including some components selected from a transform module 1310, a quantization module 1311, an inverse quantization module 1314, an inverse transform module 1315, an intra-picture estimation module 1320, an intra-prediction module 1325, a motion compensation module 1330, a motion estimation module 1335, an in-loop filter 1345, a reconstructed picture buffer 1350, a MV buffer 1365, and a MV prediction module 1375, and an entropy encoder 1390. The motion compensation module 1330 and the motion estimation module 1335 are part of an inter-prediction module 1340.

In some embodiments, the modules 1310-1390 are modules of software instructions being executed by one or more processing units (e.g., a processor) of a computing device or electronic apparatus. In some embodiments, the modules 1310-1390 are modules of hardware circuits implemented by one or more integrated circuits (ICs) of an electronic apparatus. Though the modules 1310-1390 are illustrated as being separate modules, some of the modules can be combined into a single module.

The video source 1305 provides a raw video signal that presents pixel data of each video frame without compression. A subtractor 1308 computes the difference between the raw video pixel data of the video source 1305 and the predicted pixel data 1313 from the motion compensation module 1330 or intra-prediction module 1325 as prediction residual 1309. The transform module 1310 converts the difference (or the residual pixel data or residual signal 1308) into transform coefficients (e.g., by performing Discrete Cosine Transform, or DCT). The quantization module 1311 quantizes the transform coefficients into quantized data (or quantized coefficients) 1312, which is encoded into the bitstream 1395 by the entropy encoder 1390.

The inverse quantization module 1314 de-quantizes the quantized data (or quantized coefficients) 1312 to obtain transform coefficients, and the inverse transform module 1315 performs inverse transform on the transform coefficients to produce reconstructed residual 1319. The reconstructed residual 1319 is added with the predicted pixel data 1313 to produce reconstructed pixel data 1317. In some embodiments, the reconstructed pixel data 1317 is temporarily stored in a line buffer (not illustrated) for intra-picture prediction and spatial MV prediction. The reconstructed pixels are filtered by the in-loop filter 1345 and stored in the reconstructed picture buffer 1350. In some embodiments, the reconstructed picture buffer 1350 is a storage external to the video encoder 1300. In some embodiments, the reconstructed picture buffer 1350 is a storage internal to the video encoder 1300.

The intra-picture estimation module 1320 performs intra-prediction based on the reconstructed pixel data 1317 to produce intra prediction data. The intra-prediction data is provided to the entropy encoder 1390 to be encoded into bitstream 1395. The intra-prediction data is also used by the intra-prediction module 1325 to produce the predicted pixel data 1313.

The motion estimation module 1335 performs inter-prediction by producing MVs to reference pixel data of previously decoded frames stored in the reconstructed picture buffer 1350. These MVs are provided to the motion compensation module 1330 to produce predicted pixel data.

Instead of encoding the complete actual MVs in the bitstream, the video encoder 1300 uses MV prediction to generate predicted MVs, and the difference between the MVs used for motion compensation and the predicted MVs is encoded as residual motion data and stored in the bitstream 1395.

The MV prediction module 1375 generates the predicted MVs based on reference MVs that were generated for encoding previously video frames, i.e., the motion compensation MVs that were used to perform motion compensation. The MV prediction module 1375 retrieves reference MVs from previous video frames from the MV buffer 1365. The video encoder 1300 stores the MVs generated for the current video frame in the MV buffer 1365 as reference MVs for generating predicted MVs.

The MV prediction module 1375 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1395 by the entropy encoder 1390.

The entropy encoder 1390 encodes various parameters and data into the bitstream 1395 by using entropy-coding techniques such as context-adaptive binary arithmetic coding (CABAC) or Huffman encoding. The entropy encoder 1390 encodes various header elements, flags, along with the quantized transform coefficients 1312, and the residual motion data as syntax elements into the bitstream 1395. The bitstream 1395 is in turn stored in a storage device or transmitted to a decoder over a communications medium such as a network.

The in-loop filter 1345 performs filtering or smoothing operations on the reconstructed pixel data 1317 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 14:
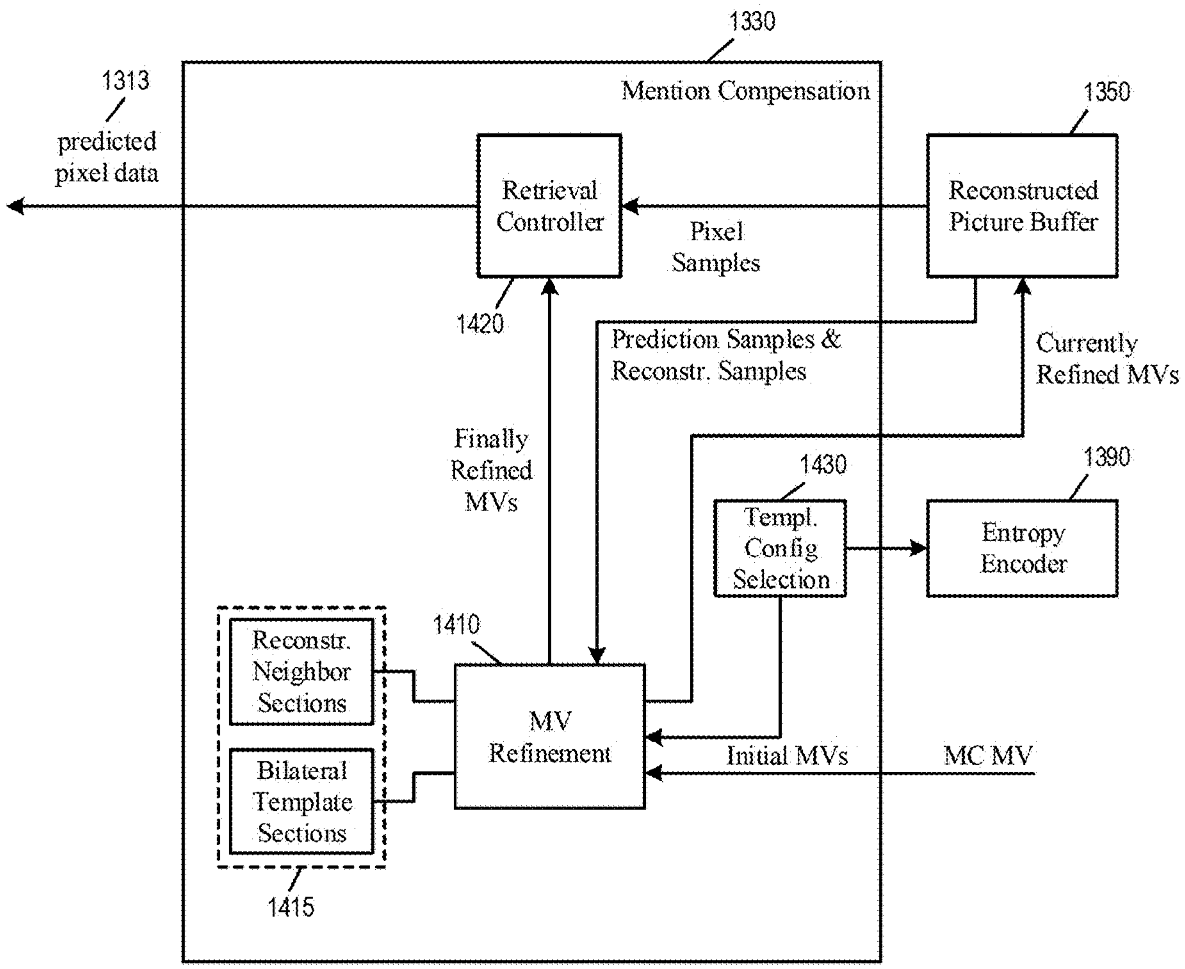
FIG. 14 illustrates portions of the video encoder that implement MV refinement with extended template matching.

FIG. 14 illustrates portions of the video encoder 1300 that implement MV refinement with extended template matching. Specifically, the figure illustrates the components of the motion compensation module 1330 of the video encoder 1300.

A MV refinement module 1410 performs MV refinement process by using the MC MV as the initial or original MVs in L0 and/or L1 directions. The MV refinement module 1410 refines the initial MVs into finally refined MVs. The finally refined MVs is then used by a retrieval controller 1420 to generate the predicted pixel data 1313 based on content of the reconstructed picture buffer 1350.

The MV refinement module 1410 uses content of the reconstructed picture buffer 1350 to construct a template 1415 for refining the motion vectors. The content retrieved from the reconstructed picture buffer 1350 includes prediction samples (or predictors or reference samples) in L0 and L1 reference pictures that are referred to by currently refined MVs (which may be the initial MVs, or any subsequent update). The retrieved content may also include reconstructed neighboring samples of the current block.

The generated template 1415 may have a configuration that is specified by a template configuration module 1430, which may indicate which template sections to use, specify the geometries of various template sections, whether to use reconstructed neighboring samples, whether to use average of reference samples, etc. Thus, the template 1415 may include reconstructed neighbor sections (based on reconstructed neighboring samples in the current picture) and/or average reference sections (based on average of reference samples in L0 and L1 reference pictures). The configuration of the template may also be provided to the entropy encoder 1390 to be signaled in the bitstream 1395.

The MV refinement module 1410 may refine/update MV0 and MV1 using costs that are computed based on the template 1415. The cost is computed by comparing the template 1415 with prediction samples that are fetched from reference pictures according to the refined/updated MVs. In some embodiments, multiple template sections are used to generate different updates of a motion vector and the updated motion vector having the lower cost is selected to be the refined motion vector. In some embodiments, the motion vectors are updated iteratively and the template 1415 is regenerated using prediction samples fetched according to the updated motion vectors.

Figure 15:
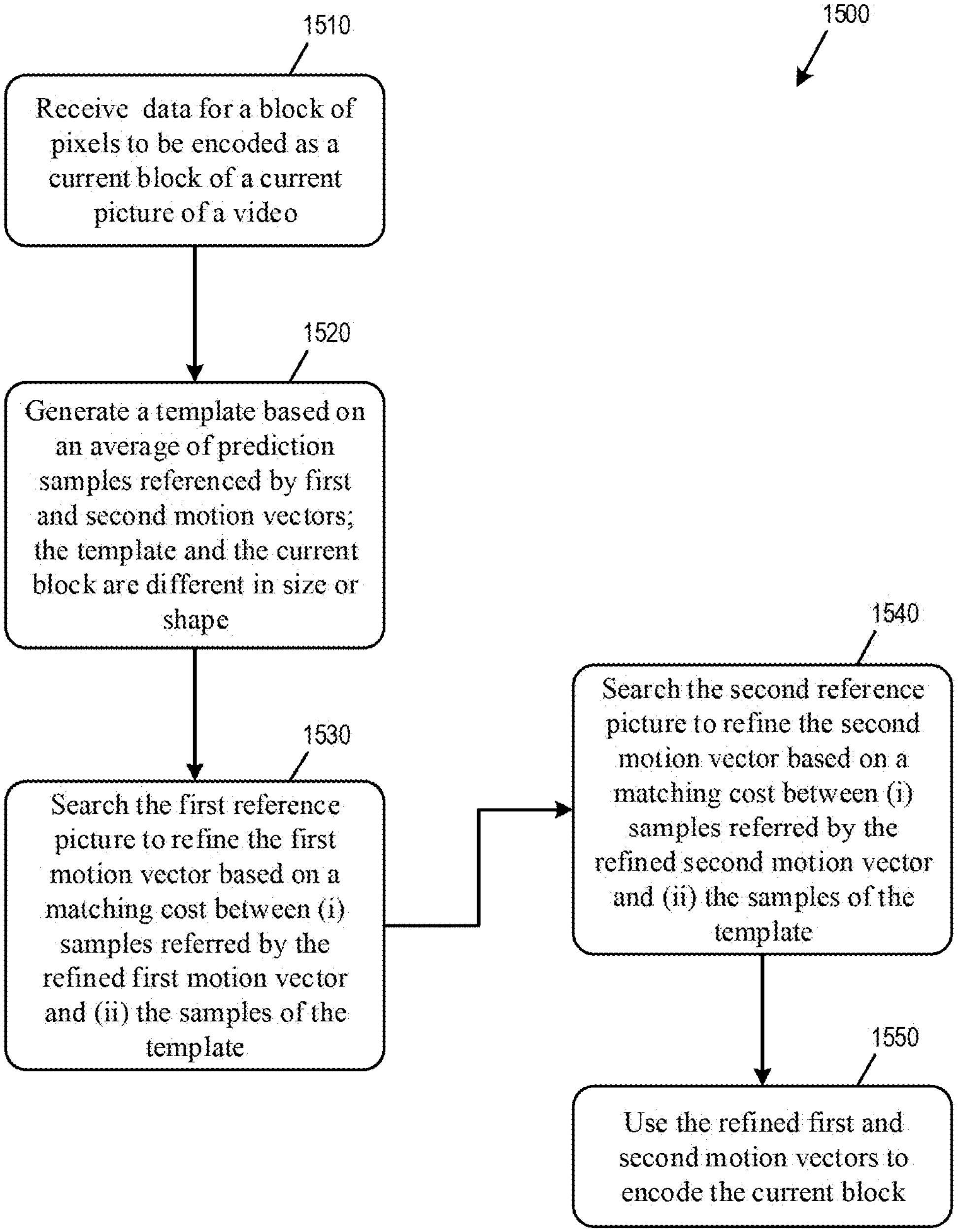
FIG. 15 conceptually illustrates a process for refining motion vectors by using extend templates.

FIG. 15 conceptually illustrates a process 1500 for refining motion vectors by using extend templates. In some embodiments, one or more processing units (e.g., a processor) of a computing device implementing the encoder 1300 performs the process 1500 by executing instructions stored in a computer readable medium. In some embodiments, an electronic apparatus implementing the encoder 1300 performs the process 1500.

The encoder receives (at block 1510) data for a block of pixels to be encoded as a current block of a current picture of a video. The current block is associated with first and second motion vectors that reference prediction samples in first and second reference pictures.

The encoder generates (at block 1520) a template based on an average of prediction samples referenced by the first and second motion vectors. In some embodiments, the template and the current block are different in size or shape. In some embodiments, the template is a mixed template that includes a first section based on reconstructed samples neighboring the current block in the current picture and a second section based an average of the initial prediction samples from the first reference picture and the initial prediction samples from the second reference picture. The template may correspond to an area in the current picture that encompass the first current block, or an area in the current picture that is a sub-portion of the current block, or an area in the current picture that is partly inside the current block and partly outside the current block, wherein current block is partly outside of the area.

The encoder may signal a selection of a configuration from multiple possible configurations for the template, and the template is generated according to the selected configuration. The encoder may also scale the refined motion vectors according to a format of a chroma component and use the scaled motion vectors to fetch prediction samples of the chroma component.

The encoder searches (at block 1530) the first reference picture to refine the first motion vector based on (e.g., minimize) a matching cost between samples referred by the refined first motion vector and the samples of the template. In some embodiments, the template has two or more different template sections, and the video encoder refines the first motion vector by computing a cost of the refined first motion vector based on weights assigned to the different template sections. In some embodiments, the template includes a first template section and a second template section. The first template section is used to generate a first candidate refinement of the first motion vector and the second template section is used to generate a second candidate refinement of the first motion vector. The video encoder then refines the first motion vector based on the first and second candidate refinements (e.g., by selecting one of the first and second candidate refinements based on cost).

The encoder searches (at block 1540) the second reference picture to refine the second motion vector based on a matching cost between samples referred by the refined second motion vector and the samples of the template. In some embodiments, the encoder refines the first and second motion vectors by iteratively updating the first and second motion vectors according to the template and regenerating the template based on the updated first or second motion vectors. In some of these embodiments, the template is regenerated based on the updated first motion vector and the regenerated template is used to update the second motion vector.

The encoder encodes (at block 1550) the current block by using the refined first and second motion vectors to produce prediction residuals and to reconstruct the current block.

IV. Example Video Decoder

In some embodiments, an encoder may signal (or generate) one or more syntax element in a bitstream, such that a decoder may parse said one or more syntax element from the bitstream.

Figure 16:
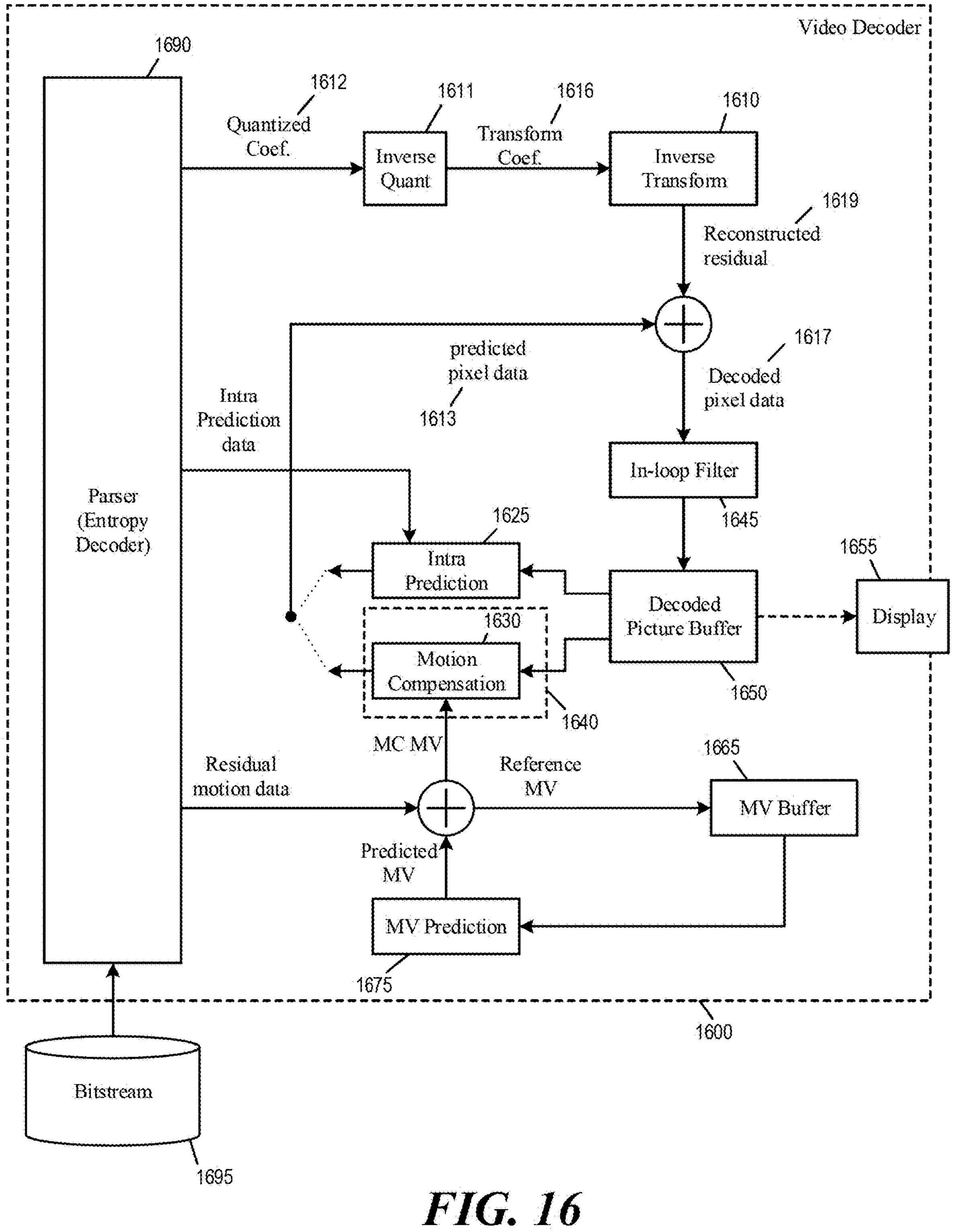
FIG. 16 illustrates an example video decoder that may perform motion vector refinements.

FIG. 16 illustrates an example video decoder 1600 that may perform motion vector refinements. As illustrated, the video decoder 1600 is an image-decoding or video-decoding circuit that receives a bitstream 1695 and decodes the content of the bitstream into pixel data of video frames for display. The video decoder 1600 has several components or modules for decoding the bitstream 1695, including some components selected from an inverse quantization module 1611, an inverse transform module 1610, an intra-prediction module 1625, a motion compensation module 1630, an in-loop filter 1645, a decoded picture buffer 1650, a MV buffer 1665, a MV prediction module 1675, and a parser 1690. The motion compensation module 1630 is part of an inter-prediction module 1640.

In some embodiments, the modules 1610-1690 are modules of software instructions being executed by one or more processing units (e.g., a processor) of a computing device. In some embodiments, the modules 1610-1690 are modules of hardware circuits implemented by one or more ICs of an electronic apparatus. Though the modules 1610-1690 are illustrated as being separate modules, some of the modules can be combined into a single module.

The parser 1690 (or entropy decoder) receives the bitstream 1695 and performs initial parsing according to the syntax defined by a video-coding or image-coding standard. The parsed syntax element includes various header elements, flags, as well as quantized data (or quantized coefficients) 1612. The parser 1690 parses out the various syntax elements by using entropy-coding techniques such as context-adaptive binary arithmetic coding (CABAC) or Huffman encoding.

The inverse quantization module 1611 de-quantizes the quantized data (or quantized coefficients) 1612 to obtain transform coefficients, and the inverse transform module 1610 performs inverse transform on the transform coefficients 1616 to produce reconstructed residual signal 1619. The reconstructed residual signal 1619 is added with predicted pixel data 1613 from the intra-prediction module 1625 or the motion compensation module 1630 to produce decoded pixel data 1617. The decoded pixels data are filtered by the in-loop filter 1645 and stored in the decoded picture buffer 1650. In some embodiments, the decoded picture buffer 1650 is a storage external to the video decoder 1600. In some embodiments, the decoded picture buffer 1650 is a storage internal to the video decoder 1600.

The intra-prediction module 1625 receives intra-prediction data from bitstream 1695 and according to which, produces the predicted pixel data 1613 from the decoded pixel data 1617 stored in the decoded picture buffer 1650. In some embodiments, the decoded pixel data 1617 is also stored in a line buffer (not illustrated) for intra-picture prediction and spatial MV prediction.

In some embodiments, the content of the decoded picture buffer 1650 is used for display. A display device 1655 either retrieves the content of the decoded picture buffer 1650 for display directly, or retrieves the content of the decoded picture buffer to a display buffer. In some embodiments, the display device receives pixel values from the decoded picture buffer 1650 through a pixel transport.

The motion compensation module 1630 produces predicted pixel data 1613 from the decoded pixel data 1617 stored in the decoded picture buffer 1650 according to motion compensation MVs (MC MVs). These motion compensation MVs are decoded by adding the residual motion data received from the bitstream 1695 with predicted MVs received from the MV prediction module 1675.

The MV prediction module 1675 generates the predicted MVs based on reference MVs that were generated for decoding previous video frames, e.g., the motion compensation MVs that were used to perform motion compensation. The MV prediction module 1675 retrieves the reference MVs of previous video frames from the MV buffer 1665. The video decoder 1600 stores the motion compensation MVs generated for decoding the current video frame in the MV buffer 1665 as reference MVs for producing predicted MVs.

The in-loop filter 1645 performs filtering or smoothing operations on the decoded pixel data 1617 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 17:
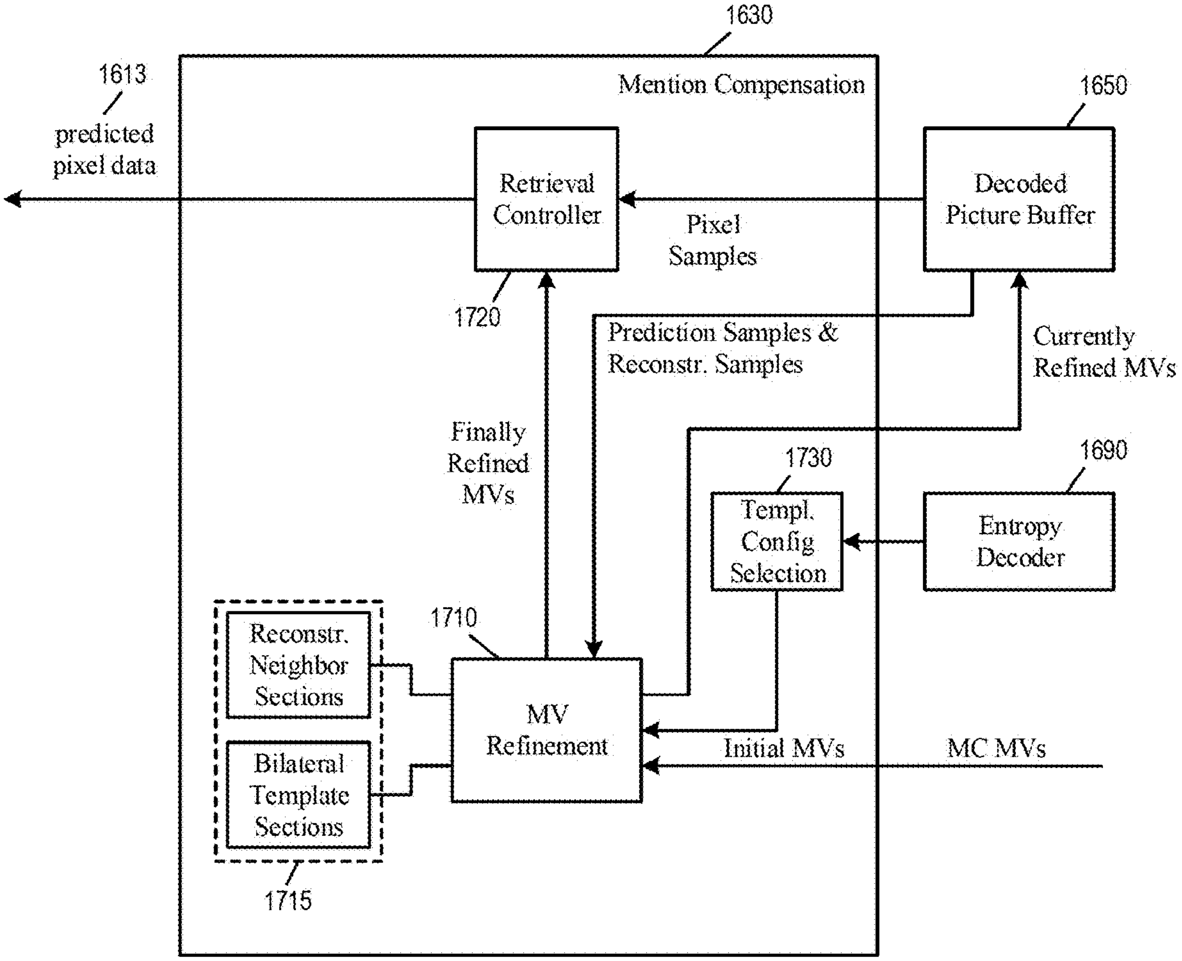
FIG. 17 illustrates portions of the video decoder that implement MV refinement with extended template matching.

FIG. 17 illustrates portions of the video decoder 1600 that implement MV refinement with extended template matching. Specifically, the figure illustrates the components of the motion compensation module 1630 of the video decoder 1600.

A MV refinement module 1710 performs MV refinement process by using the MC MV as the initial or original MVs in L0 and/or L1 directions. The MV refinement module 1710 refines the initial MVs into finally refined MVs. The finally refined MVs is then used by a retrieval controller 1720 to generate the predicted pixel data 1613 based on content of the decoded picture buffer 1650.

The MV refinement module 1710 uses content of the decoded picture buffer 1650 to construct a template 1715 for refining the motion vectors. The content retrieved from the decoded picture buffer 1650 includes prediction samples (or predictors or reference samples) in L0 and L1 reference pictures that are referred to by currently refined MVs (which may be the initial MVs, or any subsequent update). The retrieved content may also include reconstructed neighboring samples of the current block.

The generated template 1715 may have a configuration that is specified by a template configuration module 1730, which may indicate which template sections to use, specify the geometries of various template sections, whether to use reconstructed neighboring samples, whether to use average of reference samples, etc. Thus, the template 1715 may include reconstructed neighbor sections (based on reconstructed neighboring samples in the current picture) and/or average reference sections (based on average of reference samples in L0 and L1 reference pictures). The configuration of the template may be provided by the entropy decoder 1690, which parse the bitstream 1695 for related syntax elements.

The MV refinement module 1710 may refine/update MV0 and MV1 using costs that are computed based on the template 1715. The cost is computed by comparing the template 1715 with prediction samples that are fetched from reference pictures according to the refined/updated MVs. In some embodiments, multiple template sections are used to generate different updates of a motion vector and the updated motion vector having the lower cost is selected to be the refined motion vector. In some embodiments, the motion vectors are updated iteratively and the template 1715 is regenerated using prediction samples fetched according to the updated motion vectors.

Figure 18:
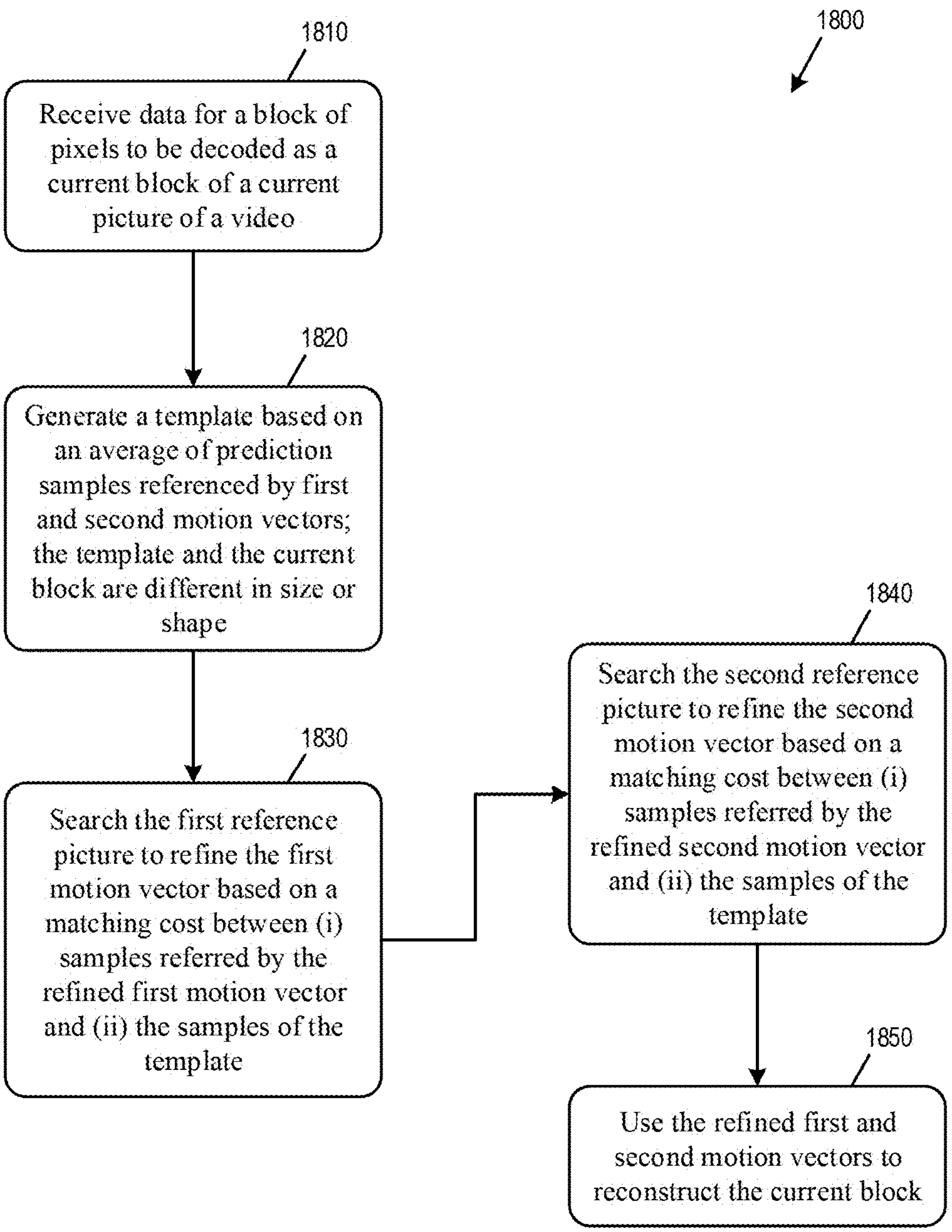
FIG. 18 conceptually illustrates a process for refining motion vectors by using extend templates.

FIG. 18 conceptually illustrates a process 1800 for refining motion vectors by using extend templates. In some embodiments, one or more processing units (e.g., a processor) of a computing device implementing the decoder 1600 performs the process 1800 by executing instructions stored in a computer readable medium. In some embodiments, an electronic apparatus implementing the decoder 1600 performs the process 1800.

The decoder receives (at block 1810) data for a block of pixels to be decoded as a current block of a current picture of a video. The current block is associated with first and second motion vectors that reference prediction samples in first and second reference pictures.

The decoder generates (at block 1820) a template based on an average of prediction samples referenced by the first and second motion vectors. In some embodiments, the template and the current block are different in size or shape. In some embodiments, the template is a mixed template that includes a first section based on reconstructed samples neighboring the current block in the current picture and a second section based an average of the initial prediction samples from the first reference picture and the initial prediction samples from the second reference picture. The template may correspond to an area in the current picture that encompass the first current block, or an area in the current picture that is a sub-portion of the current block, or an area in the current picture that is partly inside the current block and partly outside the current block, wherein current block is partly outside of the area.

The decoder may receive a selection of a configuration from multiple possible configurations for the template, and the template is generated according to the selected configuration. The decoder may also scale the refined motion vectors according to a format of a chroma component and use the scaled motion vectors to fetch prediction samples of the chroma component.

The decoder searches (at block 1830) the first reference picture to refine the first motion vector based on (e.g., minimize) a matching cost between samples referred by the refined first motion vector and the samples of the template. In some embodiments, the template has two or more different template sections, and the video decoder refines the first motion vector by computing a cost of the refined first motion vector based on weights assigned to the different template sections. In some embodiments, the template includes a first template section and a second template section. The first template section is used to generate a first candidate refinement of the first motion vector and the second template section is used to generate a second candidate refinement of the first motion vector. The video decoder then refines the first motion vector based on the first and second candidate refinements (e.g., by selecting one of the first and second candidate refinements based on cost).

The decoder searches (at block 1840) the second reference picture to refine the second motion vector based on a matching cost between samples referred by the refined second motion vector and the samples of the template. In some embodiments, the decoder refines the first and second motion vectors by iteratively updating the first and second motion vectors according to the template and regenerating the template based on the updated first or second motion vectors. In some of these embodiments, the template is regenerated based on the updated first motion vector and the regenerated template is used to update the second motion vector.

The decoder reconstructs (at block 1850) the current block by using the refined first and second motion vectors. The decoder may then provide the reconstructed current block for display as part of the reconstructed current picture.

V. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 19:
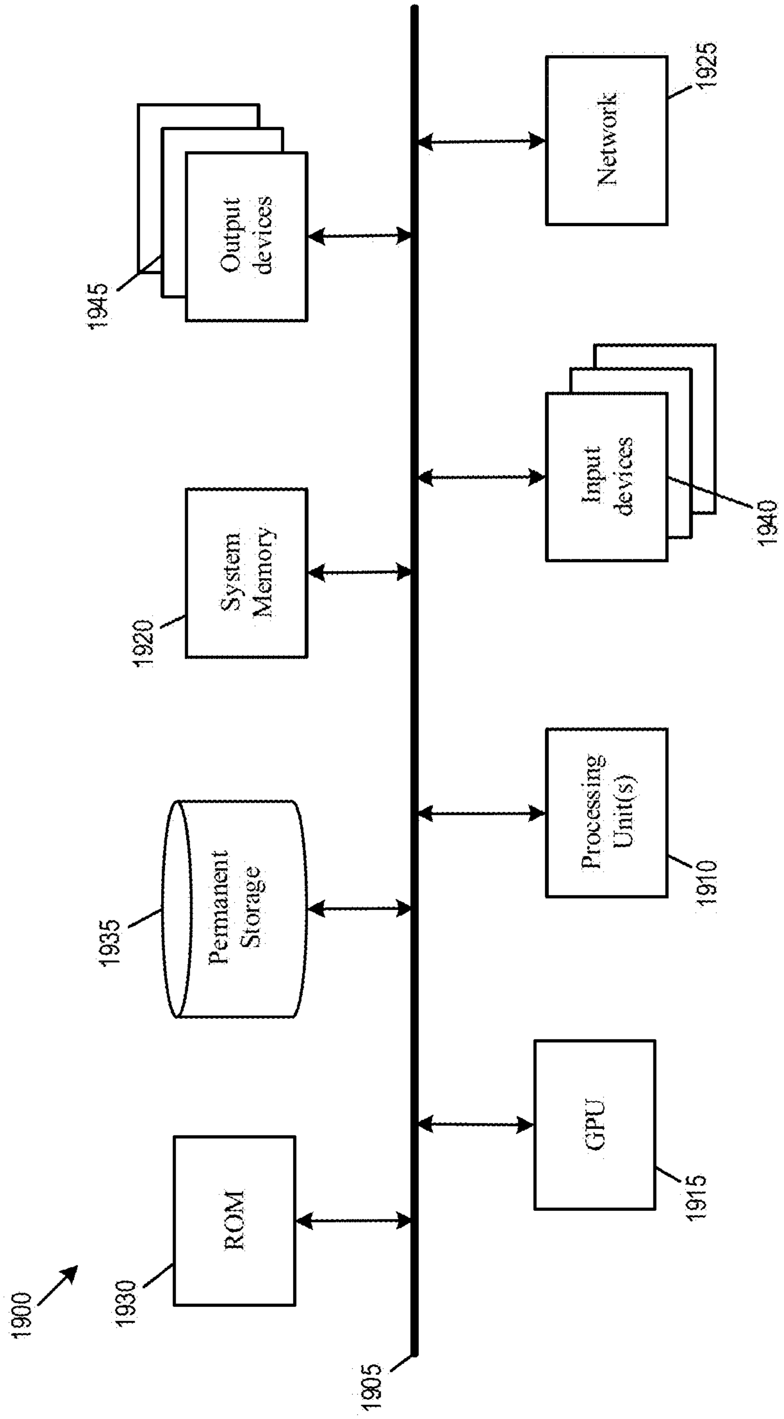
FIG. 19 conceptually illustrates an electronic system with which some embodiments of the present disclosure are implemented.

FIG. 19 conceptually illustrates an electronic system 1900 with which some embodiments of the present disclosure are implemented. The electronic system 1900 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1900 includes a bus 1905, processing unit(s) 1910, a graphics-processing unit (GPU) 1915, a system memory 1920, a network 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the GPU 1915, the read-only memory 1930, the system memory 1920, and the permanent storage device 1935.

From these various memory units, the processing unit(s) 1910 retrieves instructions to execute and data to process in order to execute the processes of the present disclosure. The processing unit(s) may be a single processor or a multi-core processor in different embodiments. Some instructions are passed to and executed by the GPU 1915. The GPU 1915 can offload various computations or complement the image processing provided by the processing unit(s) 1910.

The read-only-memory (ROM) 1930 stores static data and instructions that are used by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the present disclosure use a mass-storage device (such as a magnetic or optical disk and its corresponding disk drive) as the permanent storage device 1935.

Other embodiments use a removable storage device (such as a floppy disk, flash memory device, etc., and its corresponding disk drive) as the permanent storage device. Like the permanent storage device 1935, the system memory 1920 is a read-and-write memory device. However, unlike storage device 1935, the system memory 1920 is a volatile read-and-write memory, such a random access memory. The system memory 1920 stores some of the instructions and data that the processor uses at runtime. In some embodiments, processes in accordance with the present disclosure are stored in the system memory 1920, the permanent storage device 1935, and/or the read-only memory 1930. For example, the various memory units include instructions for processing multimedia clips in accordance with some embodiments. From these various memory units, the processing unit(s) 1910 retrieves instructions to execute and data to process in order to execute the processes of some embodiments.

The bus 1905 also connects to the input and output devices 1940 and 1945. The input devices 1940 enable the user to communicate information and select commands to the electronic system. The input devices 1940 include alphanumeric keyboards and pointing devices (also called "cursor control devices"), cameras (e.g., webcams), microphones or similar devices for receiving voice commands, etc. The output devices 1945 display images generated by the electronic system or otherwise output data. The output devices 1945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 19, bus 1905 also couples electronic system 1900 to a network 1925 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 15 and FIG. 18) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

The invention claimed is:

1. A video coding method comprising:

receiving data for a block of pixels to be encoded or decoded as a current block of a current picture of a video, wherein the current block is associated with first and second motion vectors that reference prediction samples in first and second reference pictures;

generating a template based on an average of prediction samples referenced by the first and second motion vectors, wherein the template and the current block are different in size or shape, wherein the template comprises a first section based on reconstructed samples neighboring the current block in the current picture and a second section based on an average of initial prediction samples from the first reference picture and initial prediction samples from the second reference picture;

searching the first reference picture to refine the first motion vector based on a matching cost between samples referred by the refined first motion vector and the samples of the template;

searching the second reference picture to refine the second motion vector based on a matching cost between samples referred by the refined second motion vector and the samples of the template; and using the refined first and second motion vectors to encode or decode the current block.

2. The video coding method of claim 1, wherein the template corresponds to an area in the current picture that encompasses the first current block.

3. The video coding method of claim 1, wherein the template corresponds to an area in the current picture that is a sub-portion of the current block.

4. The video coding method of claim 1, wherein the template corresponds to an area in the current picture that is partly inside the current block and partly outside the current block, wherein the current block is partly outside of the area.

5. The video coding method of claim 1, where the template comprises a first template section and a second template section, wherein the first template section is used to generate a first candidate refinement of the first motion vector and the second template section is used to generate a second candidate refinement of the first motion vector, wherein the first motion vector is refined based on the first and second candidate refinements.

6. The video coding method of claim 5, wherein one of the first and second candidate refinement of the first motion vector is selected as the refined first motion vector.

7. The video coding method of claim 1, wherein the template comprises two or more different template sections, wherein refining the first motion vector comprises computing a cost of the refined first motion vector based on weights assigned to the different template sections.

8. The video coding method of claim 1, further comprising receiving or signaling a selection of a configuration from a plurality of possible configurations for the template, wherein the template is generated according to the selected configuration.

9. The video coding method of claim 1, further comprising scaling the refined motion vectors according to a format of a chroma component and using the scaled motion vectors to fetch prediction samples of the chroma component.

10. The video coding method of claim 1, wherein refining the first and second motion vectors comprises iteratively updating the first and second motion vectors according to the template and regenerating the template based on the updated first or second motion vectors.

11. The video coding method of claim 10, wherein the template is regenerated based on the updated first motion vector and the regenerated template is used to update the second motion vector.

12. A video decoding method comprising:

receiving data for a block of pixels to be decoded as a current block of a current picture of a video, wherein the current block is associated with first and second motion vectors that reference prediction samples in first and second reference pictures;

generating a template based on an average of prediction samples referenced by the first and second motion vectors, wherein the template and the current block are different in size or shape, wherein the template comprises a first section based on reconstructed samples neighboring the current block in the current picture and a second section based on an average of initial prediction samples from the first reference picture and initial prediction samples from the second reference picture;

searching the first reference picture to refine the first motion vector based on a matching cost between samples referred by the refined first motion vector and the samples of the template;

searching the second reference picture to refine the second motion vector based on a matching cost between samples referred by the refined second motion vector and the samples of the template; and using the refined first and second motion vectors to reconstruct the current block.

13. A video encoding method comprising:

receiving data for a block of pixels to be encoded as a current block of a current picture of a video, wherein the current block is associated with first and second motion vectors that reference prediction samples in first and second reference pictures;

generating a template based on an average of prediction samples referenced by the first and second motion vectors, wherein the template and the current block are different in size or shape, wherein the template comprises a first section based on reconstructed samples neighboring the current block in the current picture and a second section based on an average of initial prediction samples from the first reference picture and initial prediction samples from the second reference picture;

searching the first reference picture to refine the first motion vector based on a matching cost between samples referred by the refined first motion vector and the samples of the template;

searching the second reference picture to refine the second motion vector based on a matching cost between samples referred by the refined second motion vector and the samples of the template; and using the refined first and second motion vectors to encode the current block.

14. An electronic apparatus comprising:

a video coder circuit configured to perform operations comprising:

receiving data for a block of pixels to be encoded or decoded as a current block of a current picture of a video, wherein the current block is associated with first and second motion vectors that reference prediction samples in first and second reference pictures;

generating a template based on an average of prediction samples referenced by the first and second motion vectors, wherein the template and the current block are different in size or shape, wherein the template comprises a first section based on reconstructed samples neighboring the current block in the current picture and a second section based on an average of initial prediction samples from the first reference picture and initial prediction samples from the second reference picture;

searching the first reference picture to refine the first motion vector based on a matching cost between samples referred by the refined first motion vector and the samples of the template;

searching the second reference picture to refine the second motion vector based on a matching cost between samples referred by the refined second motion vector and the samples of the template; and using the refined first and second motion vectors to encode or decode the current block.

15. A video coding method comprising:

receiving data for a block of pixels to be encoded or decoded as a current block of a current picture of a video, wherein the current block is associated with first and second motion vectors that reference prediction samples in first and second reference pictures;

generating a template based on an average of prediction samples referenced by the first and second motion vectors, wherein the template comprises a first section based on reconstructed samples neighboring the current block in the current picture and a second section based on an average of initial prediction samples from the first reference picture and initial prediction samples from the second reference picture;

iteratively searching the first and second reference pictures to refine the first and second motion vectors, wherein in each iteration the first and second motion vectors are updated and the template is regenerated according to the updated first and second motion vectors; and using the refined first and second motion vectors to encode or decode the current block.

16. The video coding method of claim 15, wherein the template is regenerated based on the updated first motion vector and the regenerated template is used to update the second motion vector.

* * * * *